(12) United States Patent
Kotha et al.

(10) Patent No.: US 8,880,507 B2
(45) Date of Patent: Nov. 4, 2014

(54) LONGEST PREFIX MATCH USING BINARY SEARCH TREE

(75) Inventors: Sridhar Kotha, Warangal (IN); Satyanarayana Arvapalli, Andhra Pradesh (IN); Vikram Bichal, Hydarabad (IN); Anil Kumar Gajkela, Nalgonda (IN); Srinivas Reddy Bhima reddy, Andhra Pradesh (IN); Balajl Tadepalli, Bangalore (IN); Venkatesh Nagapudl, Milpitas, CA (US); Satsheel Altekar, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 216 days.

(21) Appl. No.: 12/913,717

(22) Filed: Oct. 27, 2010

(65) Prior Publication Data

US 2012/0023082 A1 Jan. 26, 2012

Related U.S. Application Data

(60) Provisional application No. 61/366,828, filed on Jul. 22, 2010.

(51) Int. Cl.
*G06F 17/30* (2006.01)
(52) U.S. Cl.
CPC ............................. *G06F 17/30625* (2013.01)
USPC .......................................... 707/715; 707/716
(58) Field of Classification Search
USPC .......... 707/706, 712, 713, 715, 718, 999.003, 707/999.006, 707, 716; 711/108, 120
See application file for complete search history.

(56) References Cited

U.S. PATENT DOCUMENTS

| 6,212,183 | B1 | 4/2001 | Wilford |
| 6,223,172 | B1 | 4/2001 | Hunter et al. |
| 6,237,061 | B1 | 5/2001 | Srinivasan et al. |
| 6,308,220 | B1 | 10/2001 | Mathur |
| 6,396,536 | B1 | 5/2002 | Howell et al. |
| 6,516,319 | B1 * | 2/2003 | Benayoun et al. ..................... 1/1 |
| 6,675,163 | B1 | 1/2004 | Bass et al. |
| 6,925,503 | B2 | 8/2005 | Davis et al. |
| 7,047,317 | B1 | 5/2006 | Huie et al. |

(Continued)

OTHER PUBLICATIONS

Eatherton, W. et al. "Tree Bitmap: Hardware/Software IP Lookups with Incremental Updates", ACM SIGCOMM Computer Communication Review, 34(2) 97-122, 2004.

(Continued)

*Primary Examiner* — Marc Filipczyk
(74) *Attorney, Agent, or Firm* — Bever, Hoffman & Harms, LLP

(57) ABSTRACT

Longest Prefix Match (LPM) is implemented using a binary tree based search algorithm. Masked entries are stored in a plurality of binary search engines, wherein each of the binary search engines stores masked entries of a corresponding mask length. A search value is applied to each of the binary search engines in parallel. The search value is masked within each of the binary search engines, thereby creating a plurality of masked search values, each having a masked length equal to the mask length of the corresponding binary search engine. Each of the masked search values is compared with the masked entries of the corresponding binary search engine. An LPM result is selected from the binary search engine that detects a match, and has the longest corresponding mask length. Alternately, each binary search engine stores masked entries of N mask lengths, and N consecutive comparisons are performed to identify the LPM.

34 Claims, 28 Drawing Sheets

(56) References Cited

U.S. PATENT DOCUMENTS

| | | | |
|---|---|---|---|
| 7,079,542 B2 * | 7/2006 | Park et al. | 707/999.003 |
| 7,089,240 B2 | 8/2006 | Basso et al. | |
| 7,155,516 B2 | 12/2006 | Musoll et al. | |
| 7,219,184 B2 * | 5/2007 | Stojancic | 707/999.006 |
| 7,299,227 B2 | 11/2007 | Richardson | |
| 7,424,468 B2 | 9/2008 | Park et al. | |
| 7,433,355 B2 | 10/2008 | Wilson et al. | |
| 7,577,670 B2 | 8/2009 | Ho et al. | |
| 7,630,367 B2 | 12/2009 | Singh | |
| 7,702,630 B2 | 4/2010 | Basso et al. | |
| 7,877,481 B2 | 1/2011 | Musoll et al. | |
| 7,895,213 B2 | 2/2011 | Richardson | |
| 7,940,668 B2 * | 5/2011 | Retana et al. | 370/238 |
| 7,986,696 B1 | 7/2011 | Miliavisky et al. | |
| 8,200,686 B2 * | 6/2012 | Rhoades | 707/764 |
| 2003/0163637 A1 | 8/2003 | Villaret et al. | |
| 2003/0174717 A1 | 9/2003 | Zabarski et al. | |
| 2004/0024757 A1 * | 2/2004 | Park et al. | 707/3 |
| 2004/0139274 A1 | 7/2004 | Hui | |
| 2004/0236720 A1 | 11/2004 | Basso et al. | |
| 2005/0135135 A1 | 6/2005 | Sharma et al. | |
| 2006/0036705 A1 | 2/2006 | Musoll et al. | |
| 2006/0173831 A1 | 8/2006 | Basso et al. | |
| 2007/0110090 A1 | 5/2007 | Musoll et al. | |
| 2007/0192303 A1 | 8/2007 | Stojancic | |
| 2008/0181139 A1 * | 7/2008 | Rangarajan et al. | 370/256 |

OTHER PUBLICATIONS

Shannon, Claude. "Communication Theory of Secrecy Systems", 1949, 60 pages.

Kobayashi et al. "A Longest Prefix Match Search Engine for Multi-Gigabit IP Processing", IEEE Conference on Communications, ICC 2000, Jun. 18-22, 2000, New Orleans, LA, USA, pp. 1360-1364.

Haider et al. "An Evaluation of IP-Address Lookup Algorithms", First International Conference on Industrial and Information Systems, ICIIS 2006, Aug. 8-11, 2006, Sri Lanka, pp. 571-576.

Tobola et al. "Effective Hash-based IPv6 Longest Prefix Match", IEEE 14th International Symposium on Design and Diagnostics of Electronic Circuits and Systems, DDECS 2011, Apr. 13-15, 2011, 4 pages.

Tzeng et al. "On Fast Address-Lookup Algorithms", IEEE Journal on Selected Areas in Communications, vol. 17, No. 6, Jun. 1999, pp. 1067-1082.

* cited by examiner

LONGEST PREFIX MATCH USING BINARY SEARCH TREE

CROSS-REFERENCE TO RELATED APPLICATION

The present application claims priority to U.S. Provisional Patent Application Ser. No. 61/366,828, filed on Jul. 22, 2010 and entitled "Longest Prefix Match Using Binary Search Tree", the contents of which are incorporated herein by reference for all purposes.

FIELD OF THE INVENTION

The present invention relates, in one aspect, to implementation of a Longest Prefix Match (LPM) using any binary tree based search algorithm. The invention also includes, among other things, a search engine that implements a binary search tree and methods for operating the same.

RELATED ART

Ternary content addressable memory (TCAM) has been used to implement conventional search engines. In particular, TCAMs have been used for LPM implementations that require IPv4 and IPv6 address look-ups with wildcard searches. However, TCAMs are power hungry and occupy a large layout area. In the current process technology, TCAMs are generally limited to approximately 2 million entries per chip, as a larger TCAM would cause the chip to become too large, and the cost to become too high. TCAMs also consume significant power. However, TCAMs advantageously exhibit a small search latency and a small add/delete/modify latency.

Other conventional search engines have been implemented using an AVL tree. An AVL tree is a binary search tree, which exhibits the following deficiencies. First, the height of an AVL tree is limited to $1.44*\log_2 N$ levels, wherein N is the number of entries in the search tree. Thus, for an AVL search tree having 4096 (4k) entries, the height is limited to 18 levels (i.e., $1.44*\log_2 4096 = 1.44*12 = 18$). In addition, there is a need to store left and right pointers for every node of the AVL tree, resulting in a high overhead. Finally, adding and deleting entries in the AVL tree is performed in firmware, so the latency associated with adding and deleting entries is very high.

It would therefore be desirable to have an improved search engine that overcomes the above described deficiencies of TCAMs and AVL trees, and also provides for LPM implementation at the same time.

SUMMARY

Accordingly, the present invention provides a binary search engine (BSE) instance having an improved data configuration, as well as methods for adding and deleting entries within the BSE instance. Multiple BSE instances can be configured to operate in parallel to form a large BSE structure. The BSE instance exhibits several advantages over conventional CAM, including significantly lower power consumption and smaller layout area.

In accordance with one embodiment, a BSE instance includes a binary search tree, which includes a plurality of nodes arranged in a plurality levels. Each of the nodes is either a valid node that stores a valid entry, or a free node that does not store a valid entry. The entries are stored such that the plurality of levels of the binary search tree includes a leaf level, wherein all of the nodes above the leaf level are valid nodes, all nodes below the leaf level are free nodes, and the leaf level includes one or more free nodes, wherein all of the free nodes in the leaf level are consecutive, without any intervening valid nodes. Advantageously, a relatively small number of pointers is required to identify the free nodes and the valid nodes in the binary search tree. For example, a left free pointer may identify a left-most free node in the leaf level, and a right free pointer may identify a right-most free node in the leaf level.

In accordance with another embodiment, the nodes at and above the leaf level are indexed in two different manners. An array index consecutively orders the nodes at and above the leaf level in a linear (left-to-right) order. A node index consecutively orders the nodes by levels, from the root (uppermost) level to the leaf level. The array index is used to add/delete entries within the BSE instance, and the node index is used to implement search operations within the BSE instance. Conversion tables are provided to convert from array index values to node index values (and vice versa).

In accordance with another embodiment, the binary search tree may be subdivided into a plurality of super nodes, wherein each of the super nodes includes a plurality of nodes from a plurality of levels of the binary search tree. For example, each super node can include a group of seven nodes, which span three separate levels of the binary search tree. When performing a search operation, the entries associated with a root level super node are retrieved, and a search operation is performed using the entries of the root level super node. Using the results of the initial search operation, the entries associated with a lower-level super node are subsequently retrieved, and are used to continue the search operation. This process is repeated as necessary, until a match is detected, or the leaf level of the BSE instance is reached. The super node structure enables search operations to be performed in an efficient manner.

In accordance with another embodiment, a new entry is added to the BSE instance by performing a search operation using the new entry, thereby identifying an add-node position where the new entry will be added to the binary search tree. If the add-node position matches the left free pointer or the right free pointer, the new entry is simply added at the add-node position. Otherwise, the add-node position is compared with the left free pointer and the right free pointer to determine which of these pointers is closest to the add-node position. The pointer closest to the add-node position is designated as the nearest free pointer. A bubble movement is then performed from the add-node position to the nearest free pointer, thereby filling the nearest free pointer with an entry, and creating a free node at the add-node position. The new entry is then added at the add-node position.

In accordance with another embodiment, an existing entry of the BSE instance is deleted by performing a search operation using the existing entry, thereby identifying a del-node position from which the existing entry will be deleted. If the del-node position is adjacent to either the left free pointer or the right free pointer in the leaf level, then the existing entry is simply deleted. Otherwise, the del-node position is compared with the left free pointer and the right free pointer to determine which of these pointers is closed to the del-node position. The pointer closest to the del-node position is designated as the nearest free pointer. A bubble movement is then performed from the valid node adjacent to the nearest free pointer in the leaf level to the del-node position, thereby filling the del-node position with an entry, and creating a free node at the node adjacent to the nearest free pointer in the leaf level.

In accordance with another embodiment, multiple BSE instances can be configured to operate in parallel to implement longest prefix match (LPM) search operations. In one alternative, masked entries are stored in a plurality of BSE instances, wherein each of the BSE instances stores masked entries of a corresponding mask length. A search value is then applied to each of the BSE instances in parallel. The search value is masked within each of the BSE instances, thereby creating a plurality of masked search values, each having a masked length equal to the mask length of the corresponding BSE instances. Each of the masked search values is compared with the masked entries of the corresponding BSE instances, and any BSE instances detecting a match are identified. The BSE instance that detects a match, and has the longest associated mask length, provides the detected match as the longest prefix match result.

In accordance with one embodiment, the number of BSE instances that store the masked entries of a particular mask length can be varied in response to the actual number of masked entries having the particular mask length, thereby providing efficient use of system resources. Moreover, the BSE instances that store the masked entries can have different capacities to further improve storage efficiency.

In accordance with yet another embodiment, masked entries are stored in a plurality of BSE instances, wherein each of the BSE instances stores masked entries of a corresponding group (plurality) of mask lengths. For example, each of the BSE instances may store masked entries associated with three different mask lengths. A search value is then applied to each of the BSE instances in parallel. The search value is masked within each of the BSE instances, thereby creating a plurality of first masked search values, each having a masked length equal to a first mask length of the group of mask lengths of the corresponding BSE instances. Each of the first masked search values is compared with the masked entries of the corresponding BSE instances, and any BSE instances detecting a match are identified.

Then, the search value is again masked within each of the BSE instances, thereby creating a plurality of second masked search values, each having a masked length equal to a second mask length of the group of mask lengths of the corresponding BSE instances. Each of the second masked search values is compared with the masked entries of the corresponding BSE instances, and any BSE instances detecting a match are identified. This process is repeated, until the masked entries of each of the masked lengths have been compared with the search value. At this time, the BSE instance that detects a match having the longest associated mask length, provides the detected match as the longest prefix match result.

The present invention will be more fully understood in view of the following description and drawings.

DETAILED DESCRIPTION

Figure 1:
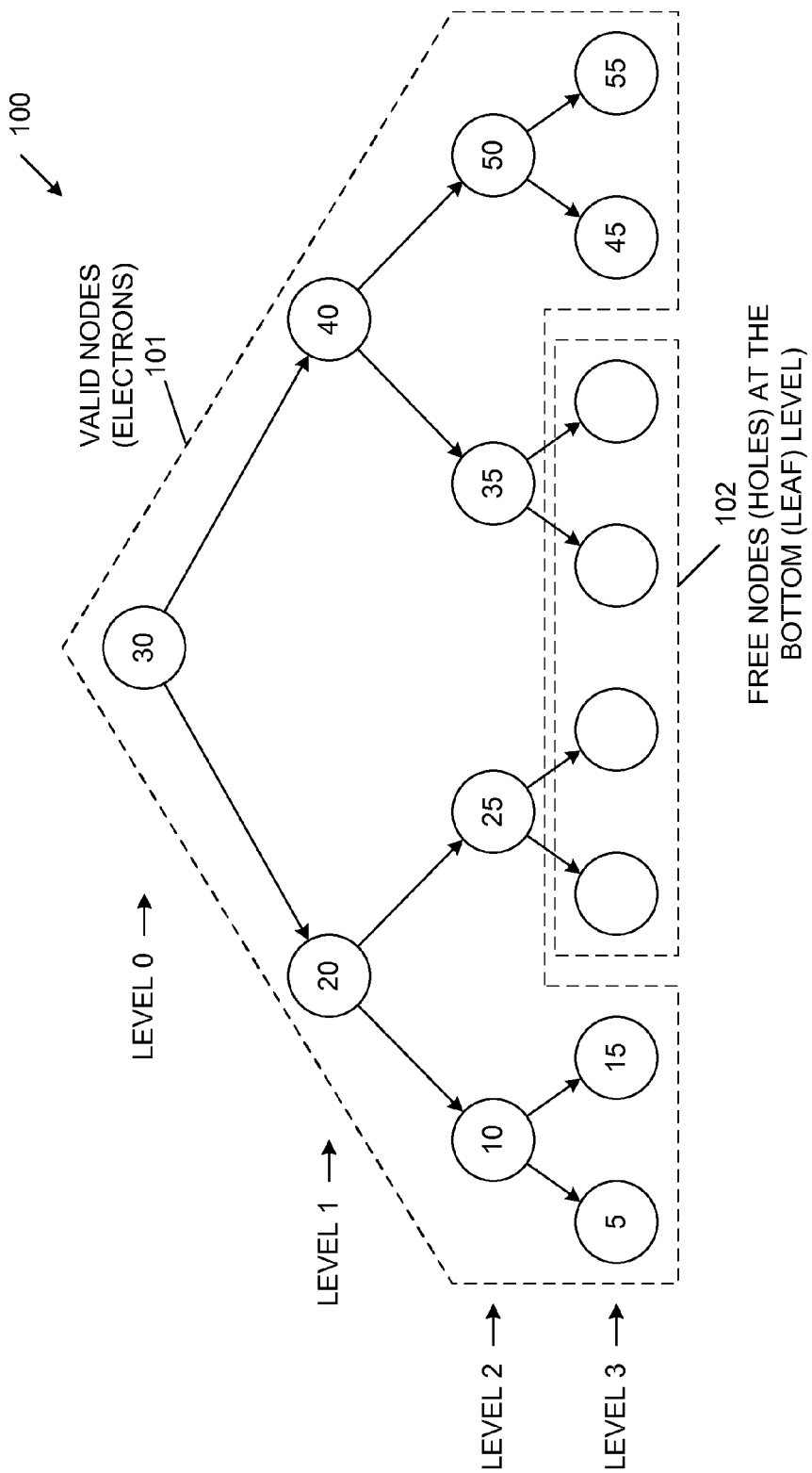
FIG. 1 is a block diagram of a binary search engine (BSE) instance in accordance with one embodiment of the present invention.

In general, the present invention includes a binary search engine (BSE) instance (bank) having an improved data configuration, as well as methods for adding and deleting entries within the BSE instance. Multiple BSE instances can be configured to operate in parallel form a large BSE structure. The BSE instance exhibits several advantages over conventional CAM, including significantly lower power consumption and smaller layout area. Operation of the BSE instance can be pipelined, such that (after an initial search latency) search results can be provided at a rate of one search result per clock cycle. In accordance with another embodiment of the present invention, multiple BSE instances can be configured to operate in parallel to implement longest prefix match (LPM) search operations.

The improved BSE instance is explained first, including the data configuration of the BSE instance, methods for performing search operations using the BSE instance, and methods for adding and deleting entries of the BSE instance. A method and structure for creating a BSE structure that includes a million (or more) entries by combining a plurality of the BSE instances is then described. A method and structure for pipelining search operations of the BSE instance is then described.

Then, architectures for implementing longest prefix match operations using one or more of the BSE instances are described. In one embodiment, conventional longest prefix match search operations are performed. In other embodiments, a plurality of the BSE instances are used to implement IPv4 entry searching, which includes longest prefix matching, but with a mask associated with each entry. In yet other embodiments, the methods of implementing longest prefix match search operations for IPv4 entries can be performed using any exact match search engine, and is not limited to the specific BSE instances described herein. Some of the exact match search engines that can be used to replace the BSE instances to perform longest prefix match search operations for IPv4 entries include AVL-based exact match search engines and hash-based exact match search engines. One of the advantages of the longest prefix match implementation of the present invention is that a binary CAM (i.e., an exact match search engine) can be used to store overflow entries, while hash-based exact match search methods require the usage of a more expensive ternary CAM to store overflow entries.

Finally, a network switch that switches packets in accordance with the various search engines of the present invention is described.

BSE Implementation

One aspect of the present invention includes a BSE implementation, which defines the manner in which a BSE instance is configured. This includes the manner in which entries are added to and deleted from the BSE instance. The BSE implementation is described in more detail below.

In accordance with the BSE implementation, all elements (entries) of a BSE instance are stored in a binary tree format, where each node in the tree corresponds to either a valid node or a free node. The nodes of the BSE instance are implemented by random access memory (RAM) (e.g., SRAM, eDRAM, DDR3 or SDRAM) or other memories capable of storing a large number of entries.

The following rules define the BSE implementation in accordance with one embodiment of the present invention.

A 'root node' is considered as level 0 of the BSE instance. Two nodes located below the root node are considered as level 1 of the BSE instance. Four nodes located below level 1 are considered as level 2 of the BSE instance, and so on.

A "bottom level" of the BSE instance is the first level, ascending from level 0, at which there is at least one free node (null node). The "bottom level" may or may not also include one or more valid nodes. The "bottom level" has at least one null node. None of the valid nodes, if any, in the "bottom level" has a corresponding child node in a lower level.

The entries are stored in the binary tree structure of the BSE instance such that all of the free nodes in the "bottom level" are grouped together (i.e., are continuous).

All of the valid (filled) nodes are analogous to electrons.

All the free (null) nodes in the "bottom level" are analogous to holes.

The left-most free node in the "bottom level" is defined as a left free-pointer and the right-most free node in the "bottom level" is defined as a right free-pointer.

The distance from an 'electron' to a 'hole' is measured as the number of elements (both electrons and holes) between them, when listing all the nodes in ascending/descending order.

FIG. 1 is a block diagram of a BSE instance 100 in accordance with one embodiment of the present invention. BSE instance 100 includes valid nodes 101 and free nodes 102, which are arranged in a basic binary tree structure. BSE instance 100 includes entry '30' at level 0, entries '20' and '40' at level 1, entries '10', '25', '35' and '50' at level 2 and entries '5', '15', '45' and '55' at level 3. Level 3 is the bottom (or leaf) level in the illustrated example. Note that a set of four adjacent free (null) nodes 102 exist in the bottom level. None of the valid nodes in level 3 has a child node (i.e., there are no valid nodes in level 4). Although there are valid nodes positioned on both sides of the free nodes 102 in the bottom level, this is not necessary. That is, the bottom level could include only free nodes. Alternately, free nodes could extend to one end of the bottom level (e.g., the nodes that include entries '45' and '55' could be free nodes).

Figure 2:
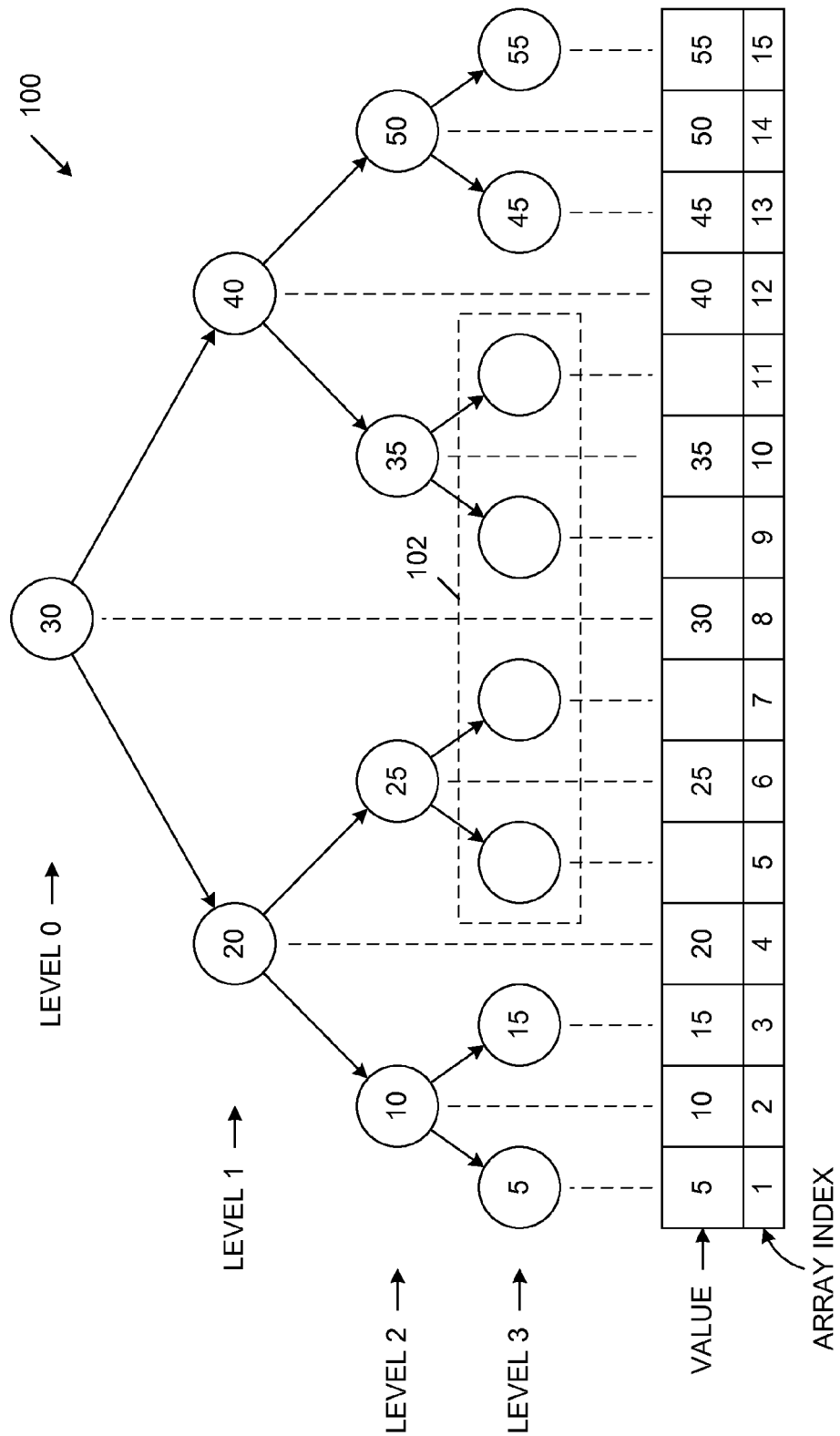
FIG. 2 is a block diagram of the BSE instance of FIG. 1, which shows the various nodes mapped to an associated array index in accordance with one embodiment of the present invention.

FIG. 2 is a block diagram of BSE instance 100, which shows the various nodes mapped to an associated array index. As illustrated in FIG. 2, each of the nodes of BSE instance 100 is assigned to an array index, wherein the array index labels the nodes sequentially from the left-most node to the right-most node. The lower portion of FIG. 2 illustrates the array index for each node of BSE instance 100, along with the value of the entry stored in the corresponding node. In accordance with the BSE implementation, as the array index increases, the values of the entries stored in the corresponding nodes increase. The view presented by FIG. 2 may be referred to as a BSE virtual array view or in-order view.

Figure 3:
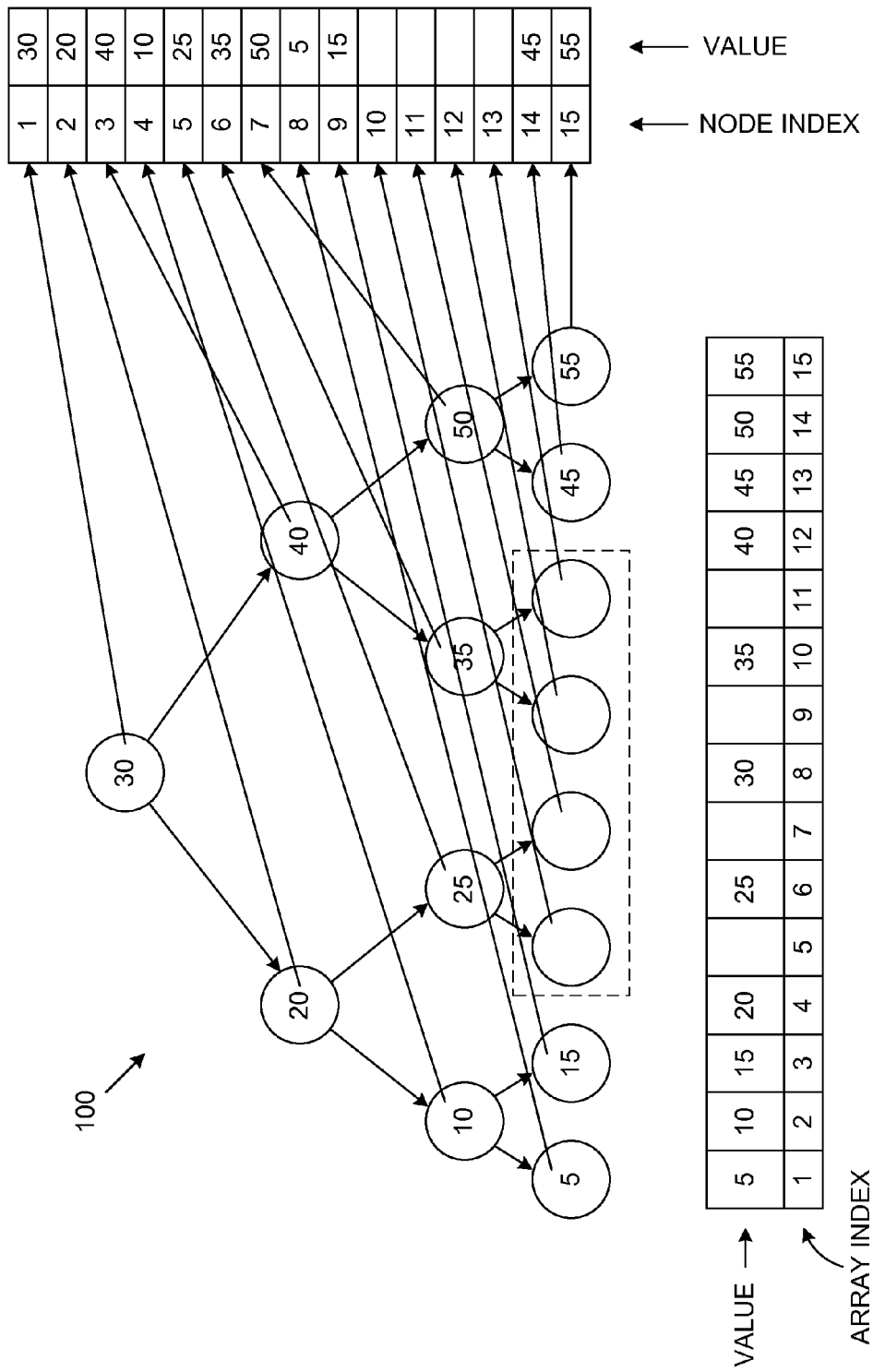
FIG. 3 is a block diagram of the BSE instance of FIG. 2, which shows the various nodes mapped to an associated node index in accordance with one embodiment of the present invention.

FIG. 3 is a block diagram of BSE instance 100, which shows the various nodes mapped to an associated node index. As illustrated in FIG. 3, each of the nodes of BSE instance 100 is also assigned to a node index, wherein the node index labels the nodes sequentially from level 0 to level 3, and wherein the nodes are labeled from left to right within each level. The right portion of FIG. 3 illustrates the node index for each node of BSE instance, along with the value of the entry stored in the corresponding node. Arrowed lines illustrate the correspondence between the each node and the corresponding node index. The view presented by FIG. 3 may be referred to as a BSE node view.

Figure 4:
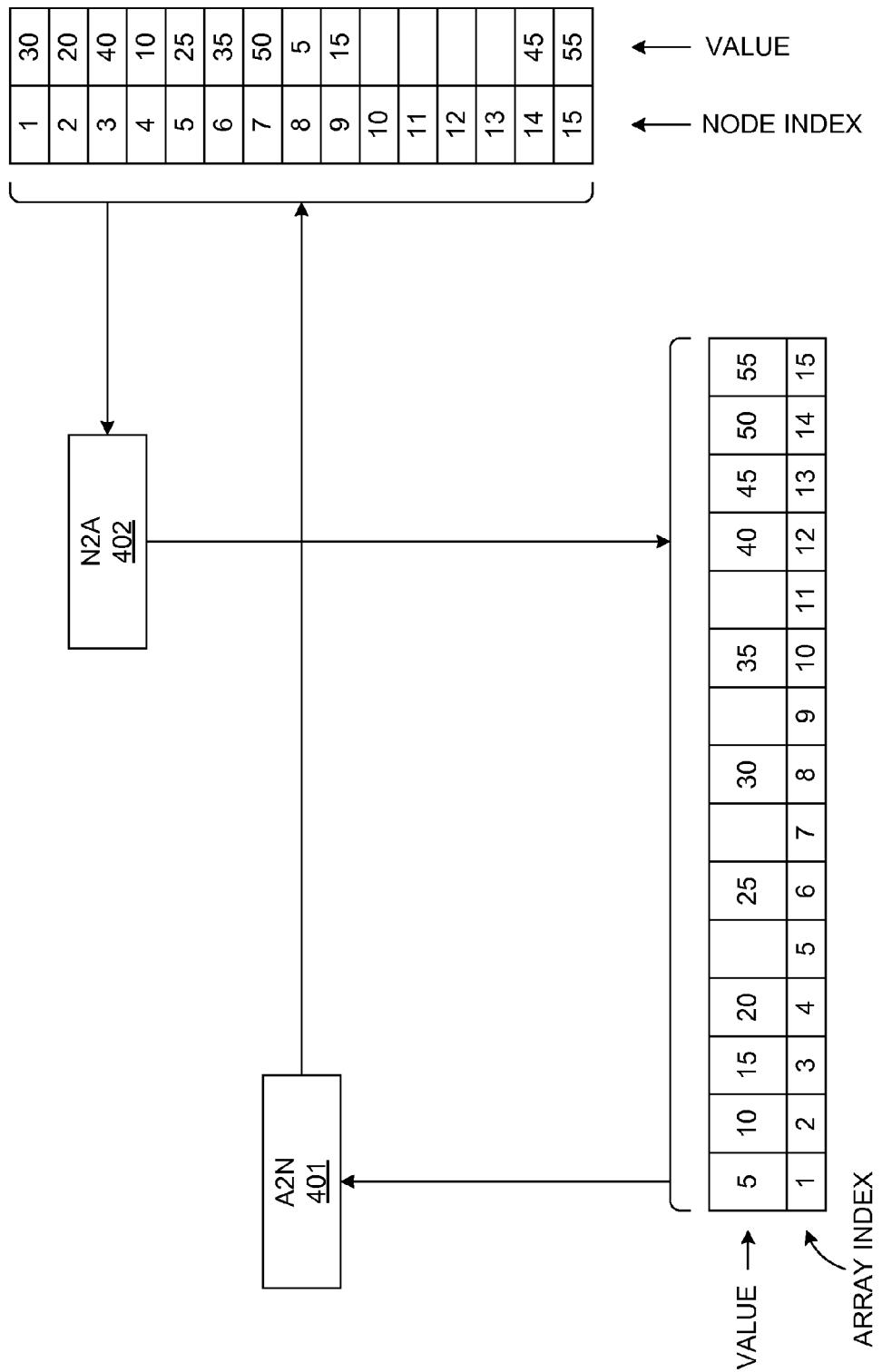
FIG. 4 is a block diagram of an array index to node index (A2N) conversion block and a node index to array index (N2A) conversion block, which perform conversions within the BSE instance of FIGS. 1-3 in accordance with one embodiment of the present invention.
Figure 5:
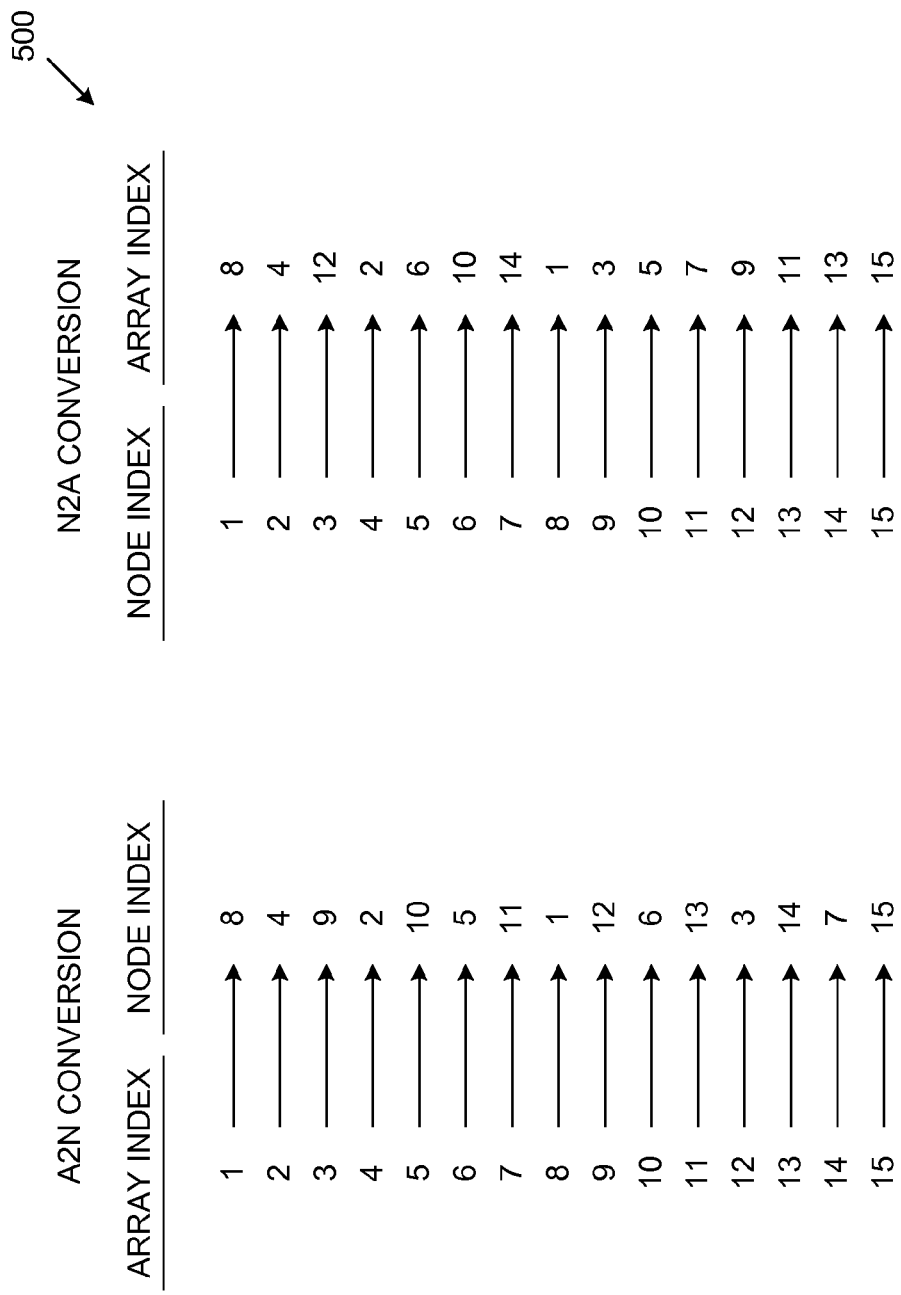
FIG. 5 is a chart that illustrates the array-to-node index value conversions and the node-to-array index value conversions performed by the A2N and N2A conversion blocks of FIG. 4, in accordance with one embodiment of the present invention.

Because each node has both an array index and a node index, conversions can be made between the two indexes. FIG. 4 is a block diagram illustrating an array index to node index (A2N) conversion block 401, which performs conversions from the node index to the array index, and node index to array index (N2A) conversion block 402, which performs conversions from the array index to the node index. For example, A2N conversion block 401 may convert the array index of '1' to the node index of '8'. Conversely, N2A conversion block 402 may convert the node index of '3' to the array index of '12'. FIG. 5 is a chart 500 that illustrates the A2N and N2A conversions for each of the nodes of BSE instance 100.

Figure 6:
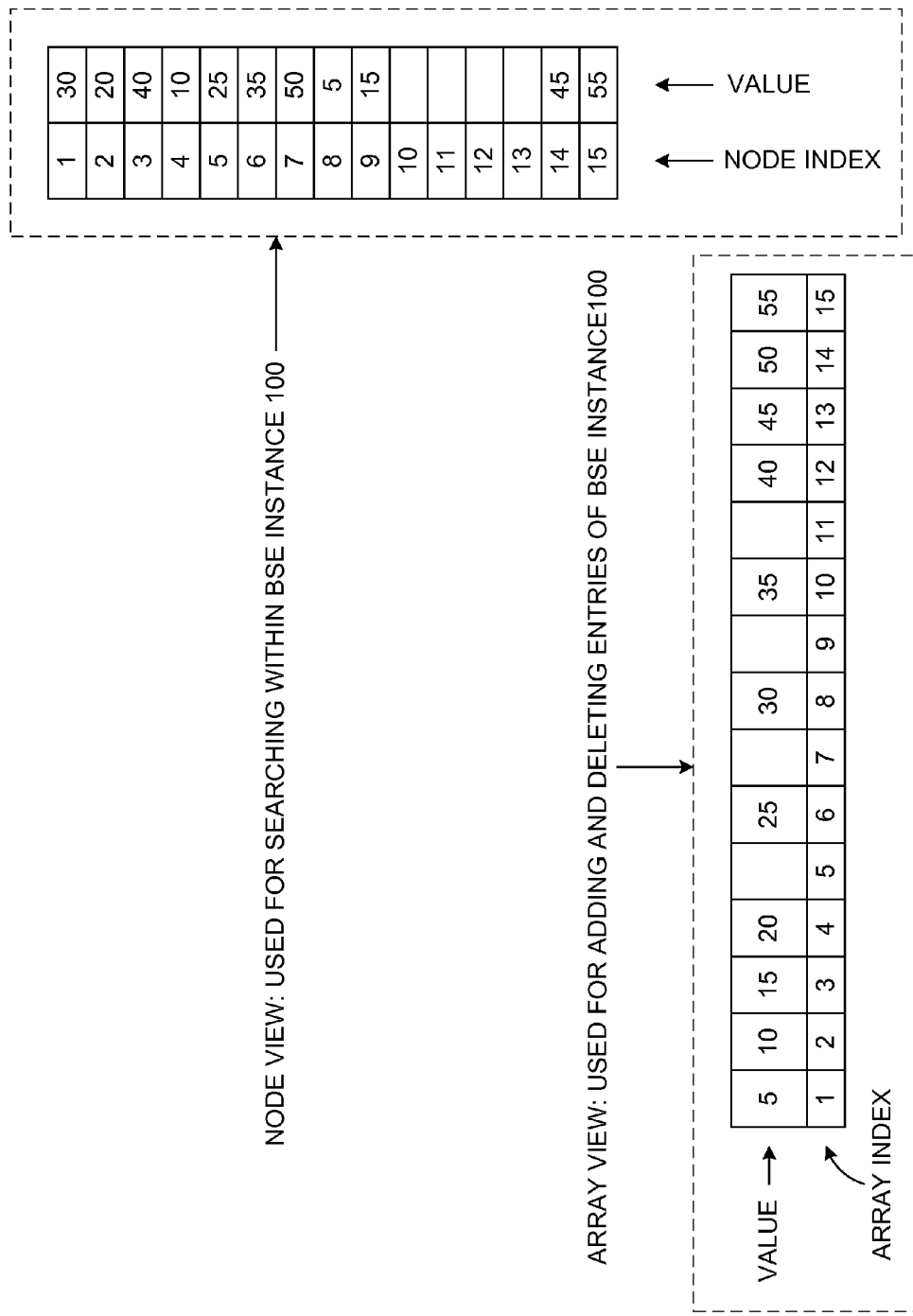
FIG. 6 is a block diagram illustrating the uses of the array index and the node index of the BSE instance of FIG. 3, in accordance with one embodiment of the present invention.

FIG. 6 is a block diagram of the array index and the node index of BSE instance 100, which illustrates the uses of the array index (i.e., array view) and the node index (i.e., node view) in accordance with one embodiment of the present invention. As described in more detail below, the array view is used to add and delete elements from BSE instance 100, while the node view is used for searching the binary tree structure of BSE instance 100.

In the example illustrated by FIGS. 1-6, the left free pointer is identified as node index '10' (array index '5'), and the right free pointer is identified as node index '13' (array index '11'). In an alternate embodiment, the BSE can be implemented with a single free pointer, by just keeping all the free nodes (holes) to the extreme left or extreme right of the bottom level. However, maintaining two free pointers potentially reduces the add-delete latency (i.e., the latency associated with adding or deleting an entry to/from BSE instance 100). When random add-deletes are implemented, two free pointers are expected to reduce the average add-delete latency by half. The following implementations are possible in accordance with different embodiments of the present invention.

Single free-pointer
dual free-pointers
Multiple free-pointers

In the multiple free-pointer embodiment, multiple left free pointer and right free pointer pairs are maintained at the bottom level of the binary search tree. For N pairs of free pointers, there are up to N groups of free nodes (holes). The first group of free nodes can be grouped together between the first pair of left/right free pointers, the second group of free nodes can be grouped together between the second pair of left/right free pointers, and so on. For example, within BSE instance 100, the nodes associated with node indexes 9-11 may form a first group of free nodes (wherein node index 9 represents a first left free pointer and node index 11 represents a first right free pointer), and wherein the nodes associated with node indexes 13-14 may form a second group of free nodes (wherein node index 13 represents a second left free pointer and node index 14 represents a second right free pointer). This embodiment potentially reduces the add-delete latency associated with BSE instance 100.

Searches in BSE instance 100 are performed in the same manner as a binary tree traversal. For example, assume that a search value of '45' is applied to BSE instance 100. The search value of '45' would first be compared with the value of the entry in the valid node of level 0 (i.e., '30'). Upon determining that the search value (45) is greater than the level 0 entry (30), processing would proceed along the lower right branch of the binary tree structure, such that the search value (45) is next compared with the value of the entry in the corresponding node in level 1 (i.e., entry '40' at node index '3'). Upon determining that the search value (45) is greater than the level 1 entry (40), processing would proceed along the lower right branch of the binary tree structure, such that the search value (45) is next compared with the value of the entry in the corresponding node in level 2 (i.e., entry '50' at node index '7'). Upon determining that the search value (45) is less than the level 2 entry (50), processing would proceed along the lower left branch of the binary tree structure, such that the search value (45) is next compared with the value of the entry in the corresponding node in level 3 (i.e., entry '45' at node index '14'). At this point, a match would be detected at node index '14'.

Super Nodes

Figure 7:
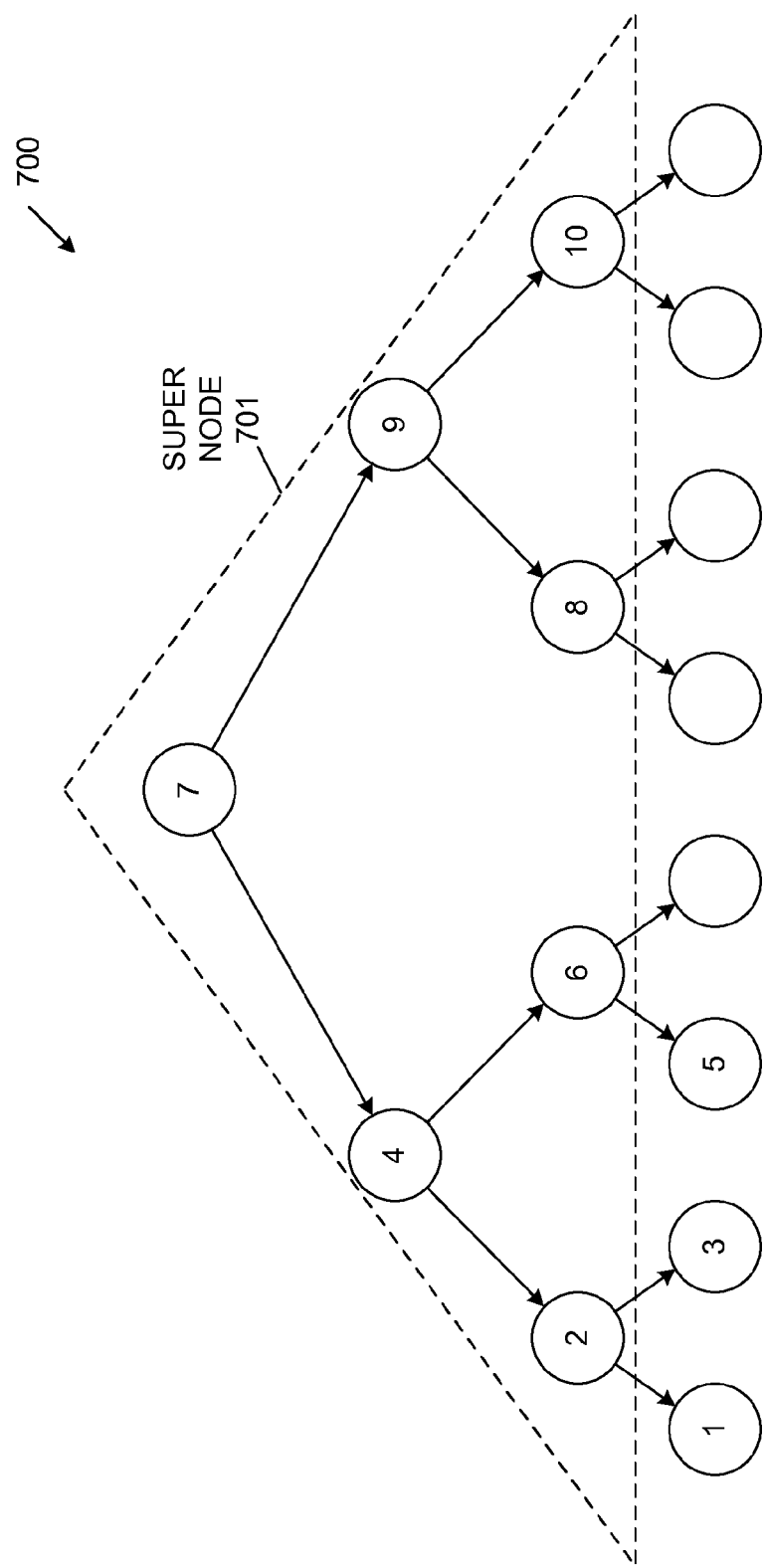
FIG. 7 is a block diagram of a super node of a BSE instance in accordance with one embodiment of the present invention.

In accordance with another embodiment of the present invention, sets of nodes within a BSE instance can be logically grouped into super nodes. FIG. 7 is a block diagram of a BSE instance 700 that includes valid nodes having entries 1-10, wherein the valid nodes that having entries 2, 4 and 6-10 form a super node 701. In this embodiment, the super node 701 is formed by three levels of entries (i.e., levels 0, 1, 2) of the BSE instance 700. However, in other embodiments, a super node may include entries from other numbers of levels.

Figure 8:
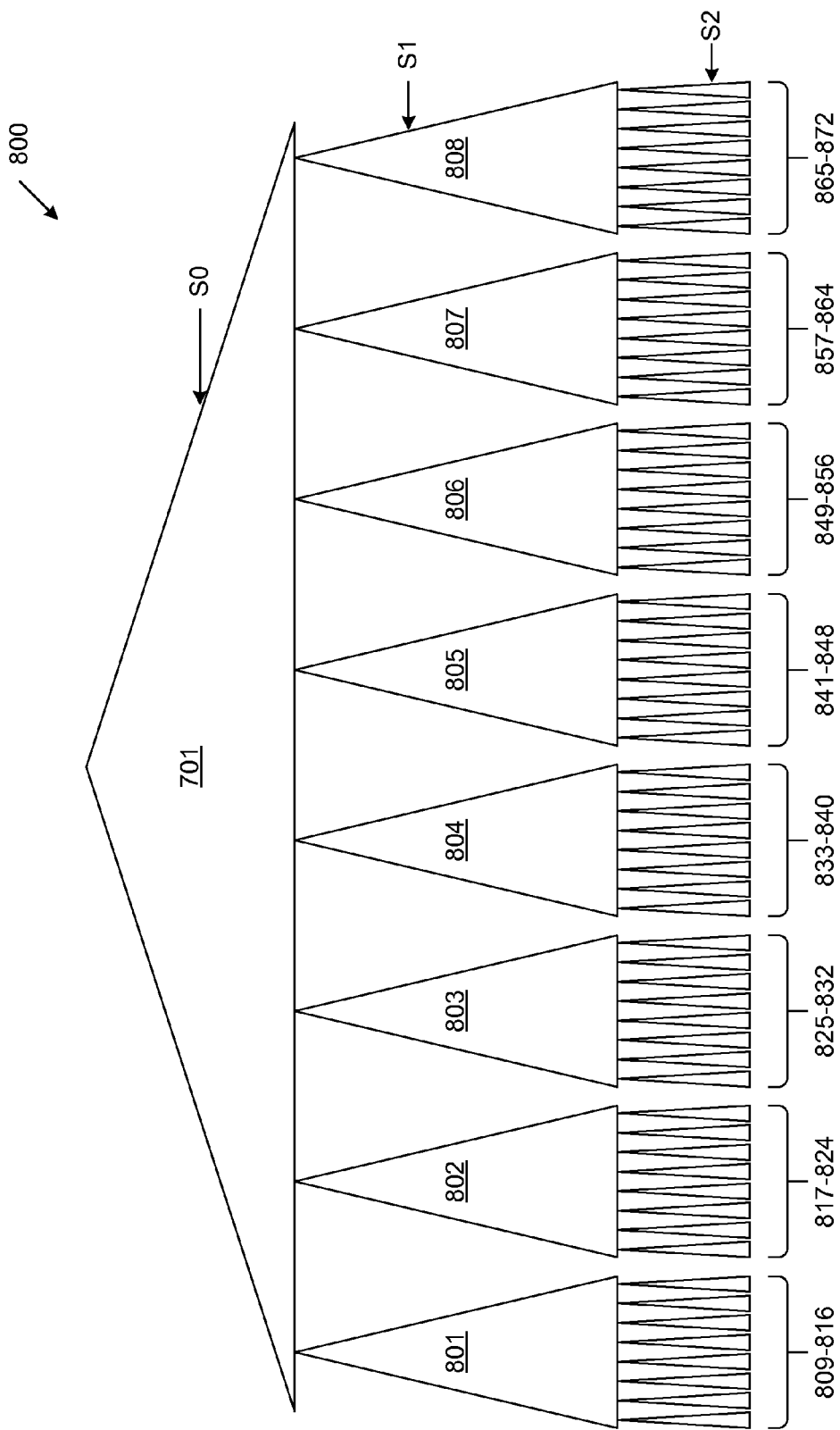
FIG. 8 is a block diagram of a super node tree structure of a BSE instance in accordance with one embodiment of the present invention.

FIG. 8 is a block diagram of a BSE instance 800 that illustrates the manner in which the super node tree structure of FIG. 7 can be expanded. As illustrated in FIG. 8, BSE instance 800 includes super nodes 701 and 801-872. Each super node, when full, contains the same number of valid nodes (e.g., seven in the illustrated example). The rules for maintaining the super node tree structure are consistent with those described above for the BSE implementation. Thus, super node 701 in FIG. 8 must be filled with entries before any entries are added to any of the lower super nodes 801-872. Similarly, super nodes 801-808 must be filled with entries before any entries are added to any of the lower super nodes 809-872.

Within the super nodes, any free (null) nodes must be located at the same 'bottom level'. For example, suppose that free (null) nodes exist in level 4 of the BSE instance 800 (i.e., within super nodes 801-808). In this example, no free nodes may exist in level 3 of the BSE instance 800 (within super nodes 801-808). That is, all of the nodes in level 3 of the BSE instance 800 must contain valid entries (i.e., be valid nodes). Similarly, no valid nodes may exist in level 5 of the BSE instance 800 (within super nodes 801-808). That is, all of the nodes in level 5 of BSE instance 800 must be free nodes. In this example, level 4 of the BSE structure 800 (within super nodes 801-808) is the bottom level. In accordance with above-described single and dual free pointer embodiments, all free nodes in the bottom level of BSE instance 800 are continuous.

In accordance with one embodiment of the present invention, the various super nodes of BSE structure 800 are indexed, such that super node 701 forms a first super node level S0, super nodes 801-808 form a second super node level S1, and super nodes 809-872 form a third super node level S2. In the present example, each super node level includes three levels of entries. This pattern may be repeated for super node levels below super node level S2 (e.g., super node level S3 would include 576 super nodes).

Figure 9:
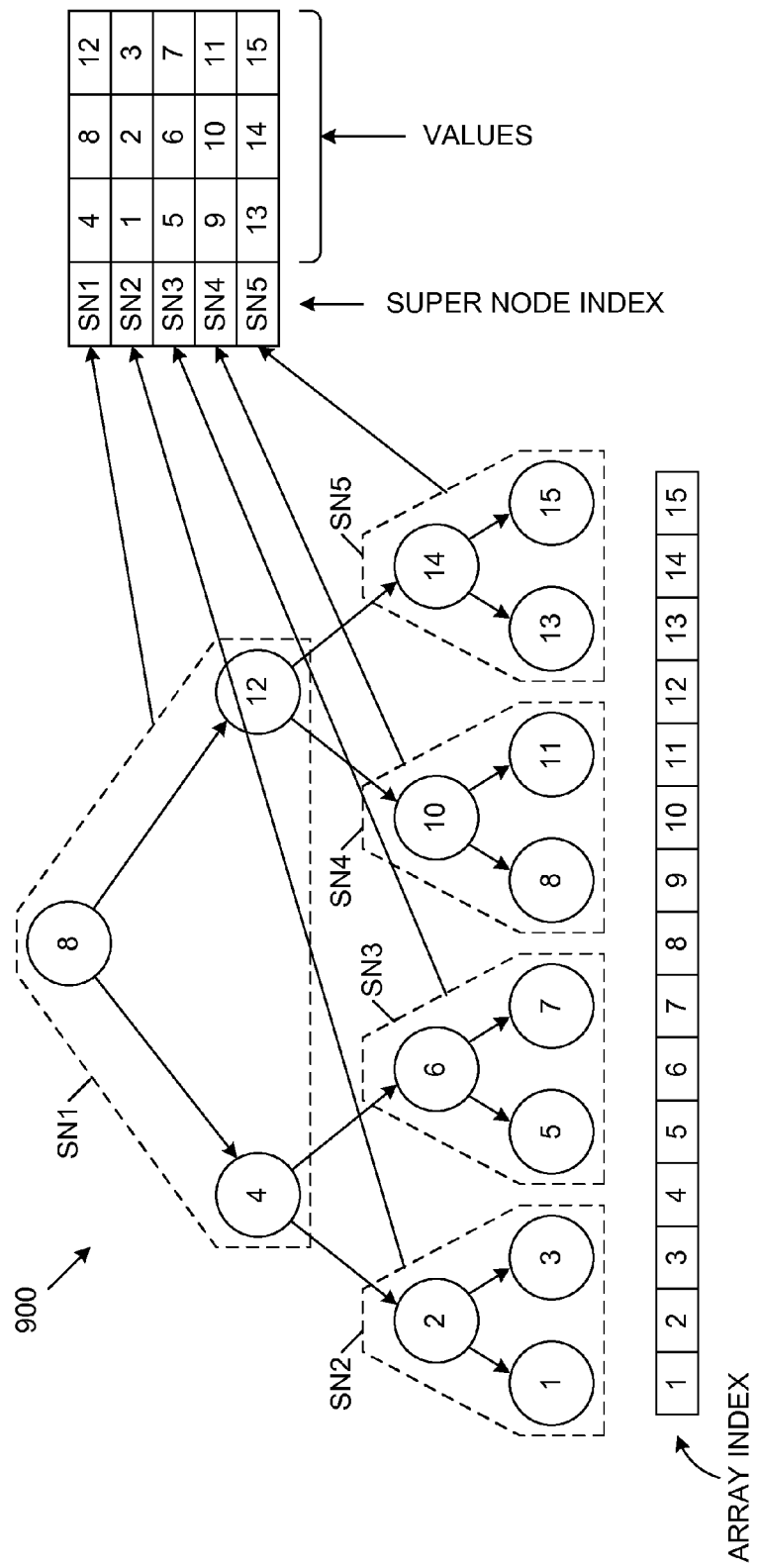
FIG. 9 is a block diagram of a four-level BSE instance including super nodes and associated indexing in accordance with one embodiment of the present invention.

FIG. 9 is a block diagram of a BSE instance 900 that includes super nodes SN1-SN5, each of which includes three entries (i.e., two levels). FIG. 9 illustrates a super node address to array index conversion in accordance with one embodiment of the present invention. For example, super node SN1 includes the entries of array index 4, 8 and 12. As described in more detail below, the super node configuration is used to reduce search latency.

Figure 10:
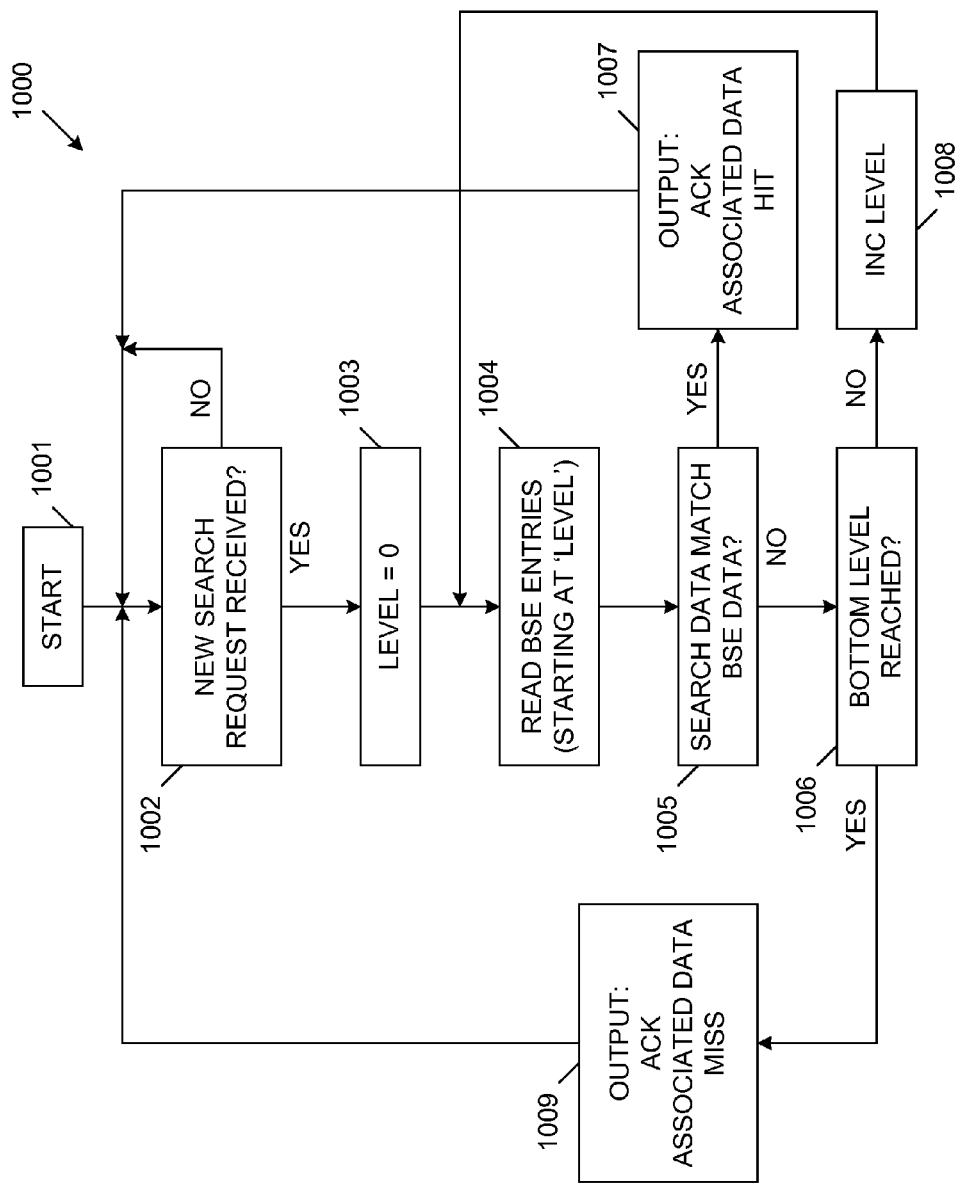
FIG. 10 is a block diagram of a BSE search flow chart in accordance with one embodiment of the present invention.

FIG. 10 is a block diagram of a search flow chart 1000 in accordance with one embodiment of the present invention. The process begins at step 1001 and proceeds to step 1002, wherein it is determined whether a new search request has been received. If no new search request is received (step 1002, NO branch), processing returns to step 1002. If a new search request is received (step 1002, YES branch), processing proceeds to step 1003, wherein the variable "LEVEL" is set to a value of '0', thereby specifying the first level (i.e., level 0) of the BSE instance. Processing proceeds to step 1004, wherein the BSE entry associated with level 0 is read from the associated valid node. In accordance with one embodiment, the BSE entries associated with several levels of the BSE instance may be read during step 1004. For example, the seven entries associated with levels 0, 1 and 2 of the BSE instance may be read during step 1004. That is, the entries of a super node (e.g., super node S0 of FIG. 9) may be retrieved to implement a first set of search operations. Processing then proceeds to step 1005, wherein the search data is compared with the retrieved entries of the BSE instance in the manner described above. If a match is detected (Step 1005, YES branch), processing proceeds to step 1007, wherein an acknowledge signal ACK, the associated match data, and a hit indication signal HIT are output. Processing then returns to step 1002.

If a match is not detected (step 1005, NO branch), processing proceeds to step 1006. If the bottom (leaf) level of the BSE instance was represented by one of the levels retrieved during step 1004 (step 1006, YES branch), then processing proceeds to step 1009, wherein an acknowledge signal ACK, the associated match data and a miss indication signal MISS are output. Processing then returns to step 1002.

If the bottom level of the BSE was not represented by one of the levels retrieved during step 1004 (Step 1006, NO branch), then the variable LEVEL is incremented, and processing returns to step 1004, wherein additional BSE entries are retrieved from the BSE instance for comparison with the search data. The amount by which the variable LEVEL is incremented is selected in response to the number of levels read during step 1004. For example, if entries are retrieved from 3 levels of the BSE during step 1004 (i.e., levels 0, 1 and 2), then the variable LEVEL is incremented by 3. Alternately, if super node indexing is used, the variable LEVEL may be incremented by one, such that entries are retrieved from super node level S1 of the BSE during step 1004. In the present example, seven entries associated with levels 3, 4 and 5 (or super node level S1) are read from the BSE instance during a second pass through step 1004 (assuming that levels 3, 4 and 5 of the BSE instance include valid nodes). The entries retrieved from levels 3, 4 and 5 of the BSE instance are selected in response to the results of the search operations performed on levels 0, 1 and 2. For example, assume a search value of '43' is applied to BSE instance 100. In this case, the search operations of the first three levels 0, 1 and 2 of the BSE indicate that the entries retrieved during the second pass through step 1004 should include node index '14' of level 3, as well as the two entries in level 4 associated with node index '14' and the four entries in level 5 associated with node index '14'. Processing proceeds in the manner described above until a match is detected, or the bottom level of the BSE instance is reached without detecting a match.

Adding an Element to the BSE Instance

The addition of an entry (element) to BSE instance 100 will now be described. Adding an element to a BSE instance includes the following steps, in accordance with one embodiment of the present invention.

Identify the node position where the new element would fit, as in a binary tree. This node position is referred to as an add-node-position.

If the add-node-position matches with either the left free-pointer or the right free-pointer, the new element is added at the add-node-position position.

Otherwise, find the distance of the add-node-position, to both the left free-pointer and the right free-pointer.

Between the left free-pointer and the right free-pointer, the pointer with the least distance from the add-node position is defined as the nearest-free-pointer.

Starting from the nearest-free-pointer, a bubble movement of the elements of the BSE instance is performed until reaching the add-node-position.

Effectively, after all the movements, a hole at the nearest-free-pointer is filled, and a hole is created at the add-node-position. This is analogous to electron-drift in semiconductors.

The new element is then added at the hole created at the add-node-position.

The left free pointer and/or right free pointer are updated as required in view of the particular actions taken during the add-node operation.

Figure 11:
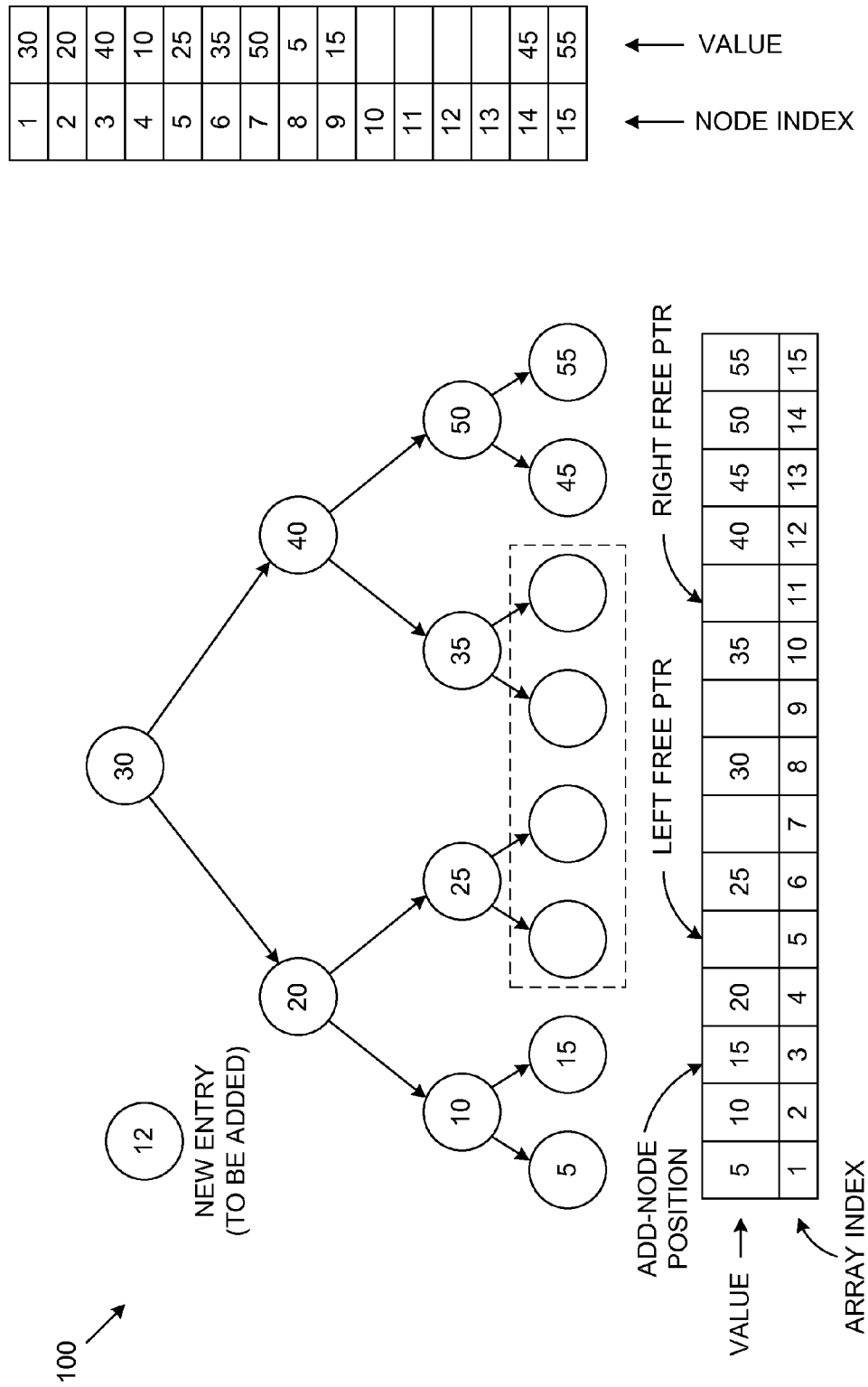
FIGS. 11, 12, 13, 14 and 15 are block diagrams of a BSE instance during various stages of an add-node operation, in accordance with one embodiment of the present invention.

FIGS. 11-15 illustrate the manner in which an element having a value of '12' is added to the BSE instance 100 in accordance with one embodiment of the present invention. First, it is determined that the new element (12) would fit at the node position that initially stores the value of '15' (i.e., the valid node identified by node index '9'). This determination is made by performing a search operation in BSE instance 100 (using the node index view), wherein the new element '12' is used as the search data. A node-to-array (N2A) index conversion is performed, converting the node index '9' to the array index '3'. This is the add-node position, as illustrated by FIG. 11.

Figure 12:
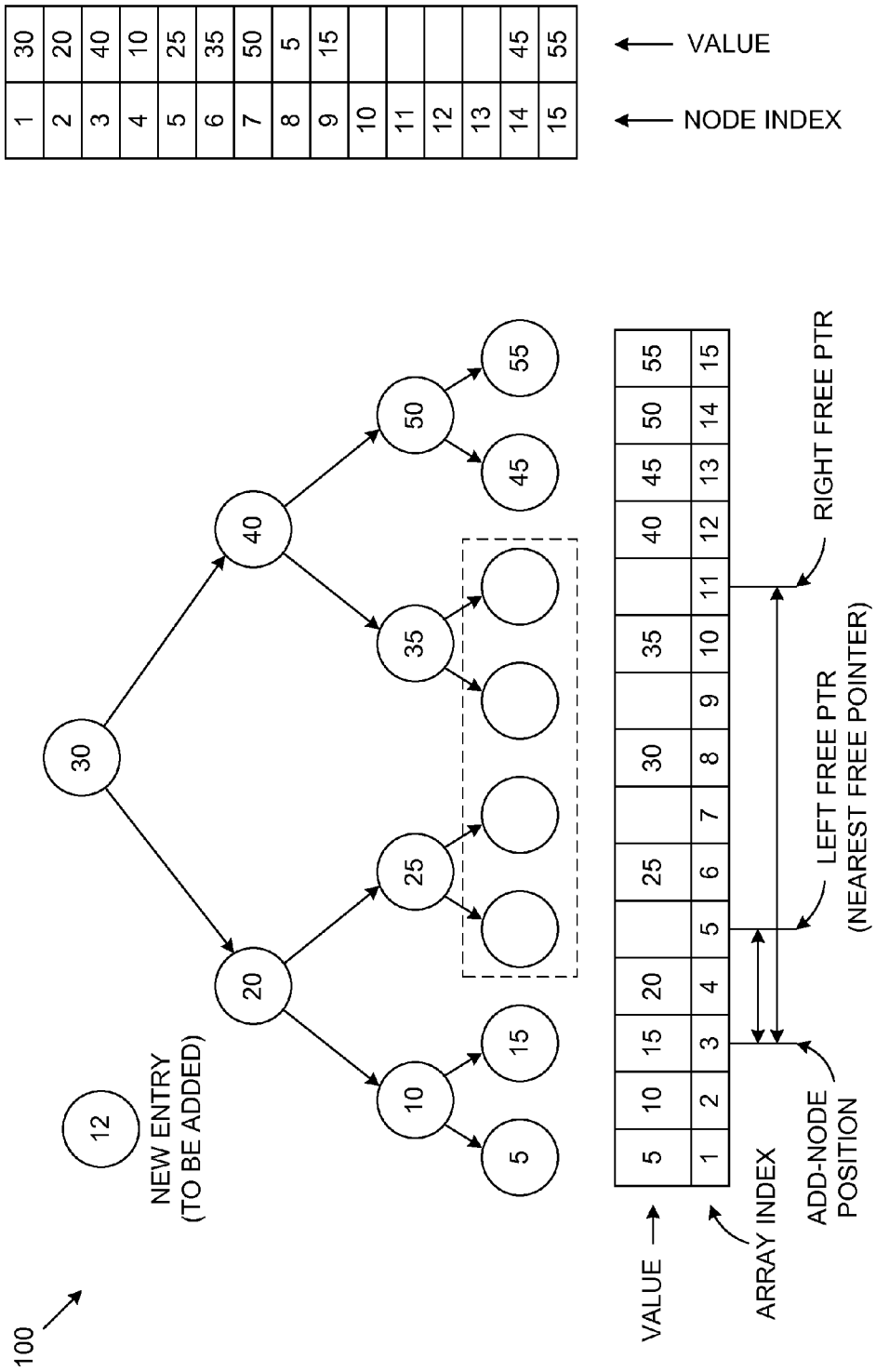

As illustrated by FIG. 12, the add-node position does not match the left free pointer (array index '5') or the right free pointer (array index '11'). Note that if the add-node position matched the left free pointer, the new element would simply be written to the free node identified by the left free pointer (i.e., array index 7 and node index 11), and the left free pointer would be updated to identify array index 9. Similar operations would be performed if the add-node position matched the right free pointer.

However, in the present example, the add-node position does not match the left free pointer or the right free pointer. The distance between the add-node position and the left free pointer (5−3=2) is less than the distance between the add-node position and the right free pointer (11−3=8). Thus, the left free pointer is designated as the nearest free pointer in the described example.

Figure 13:
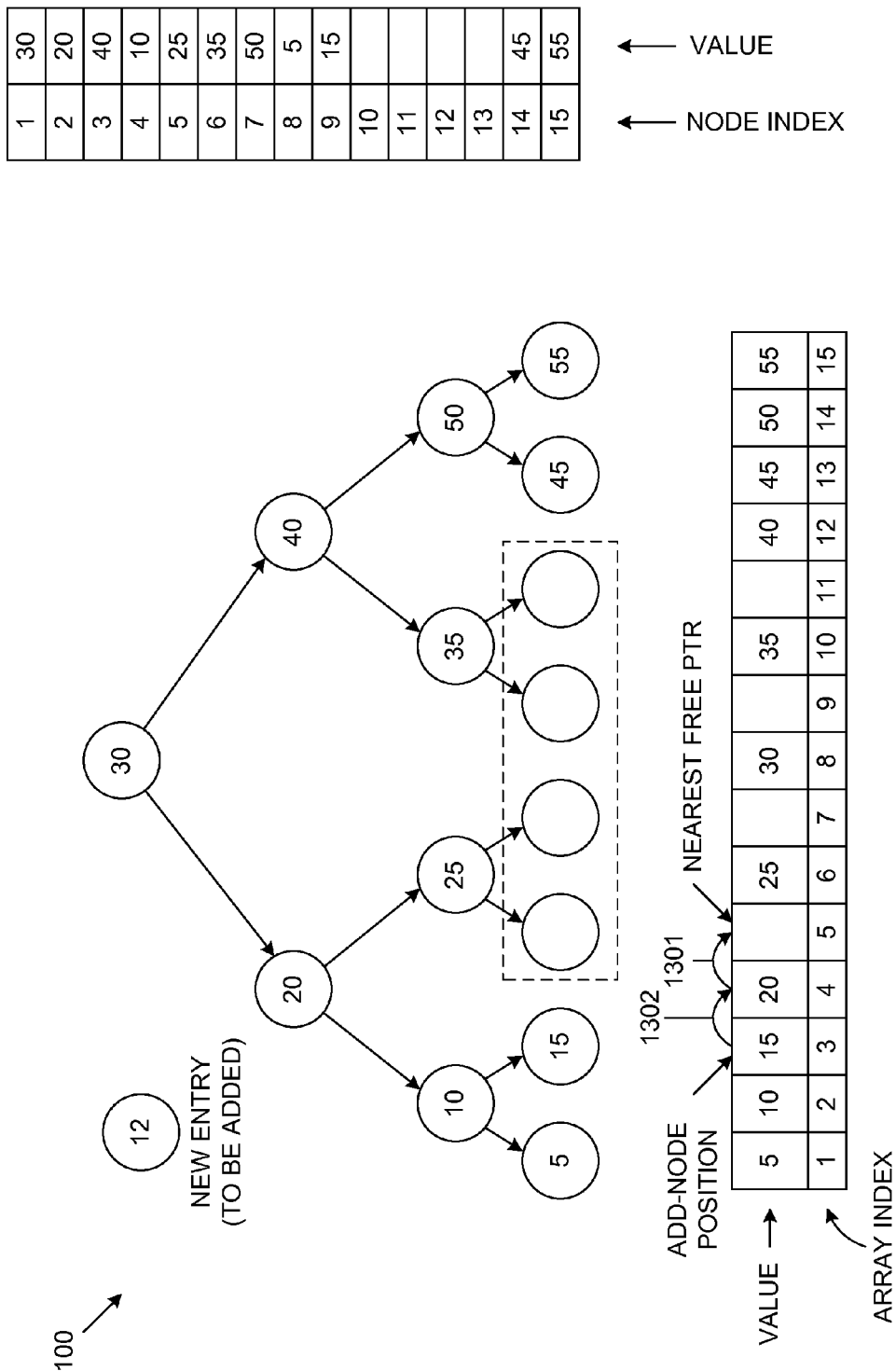
Figure 14:
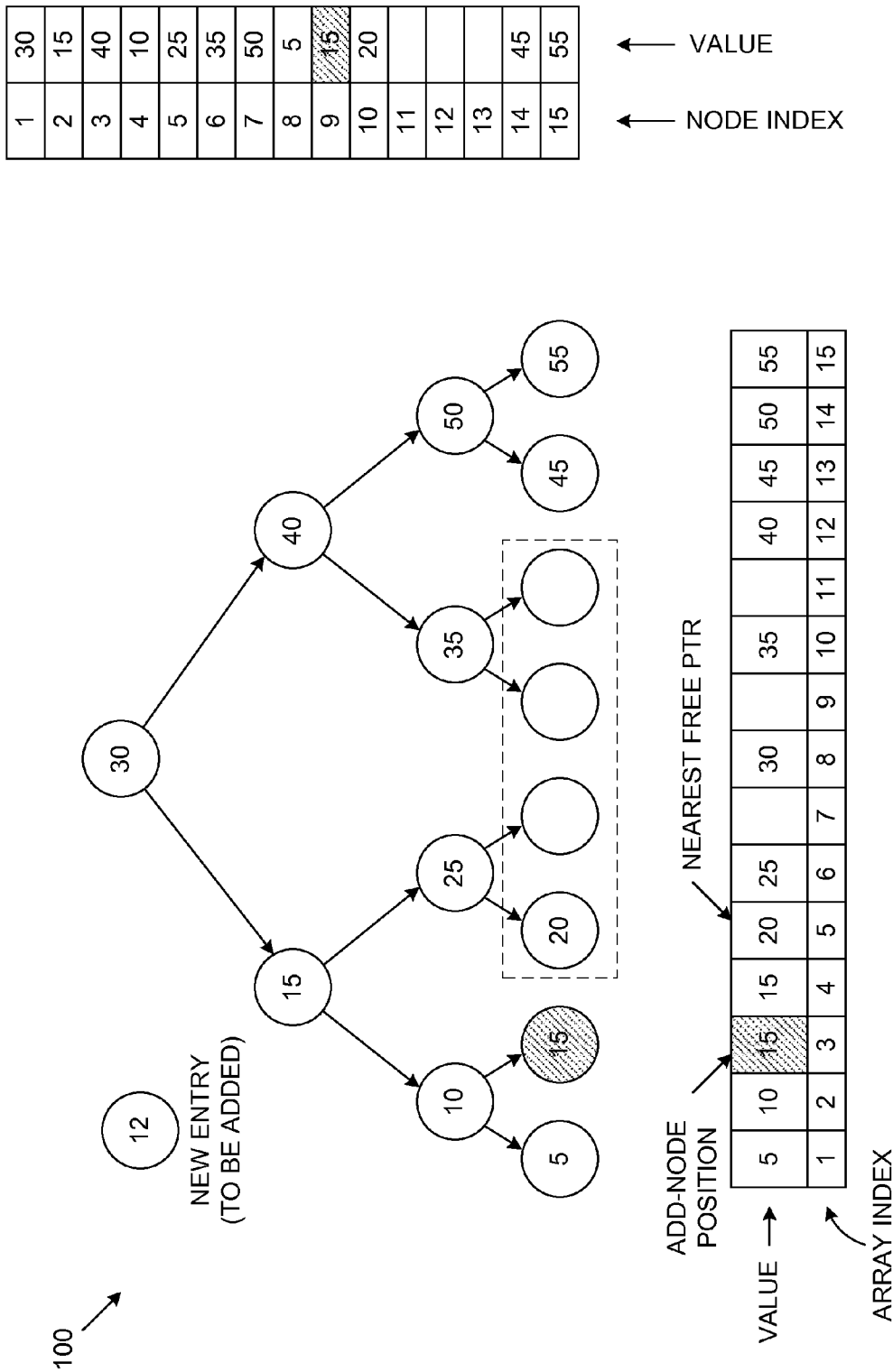
Figure 15:
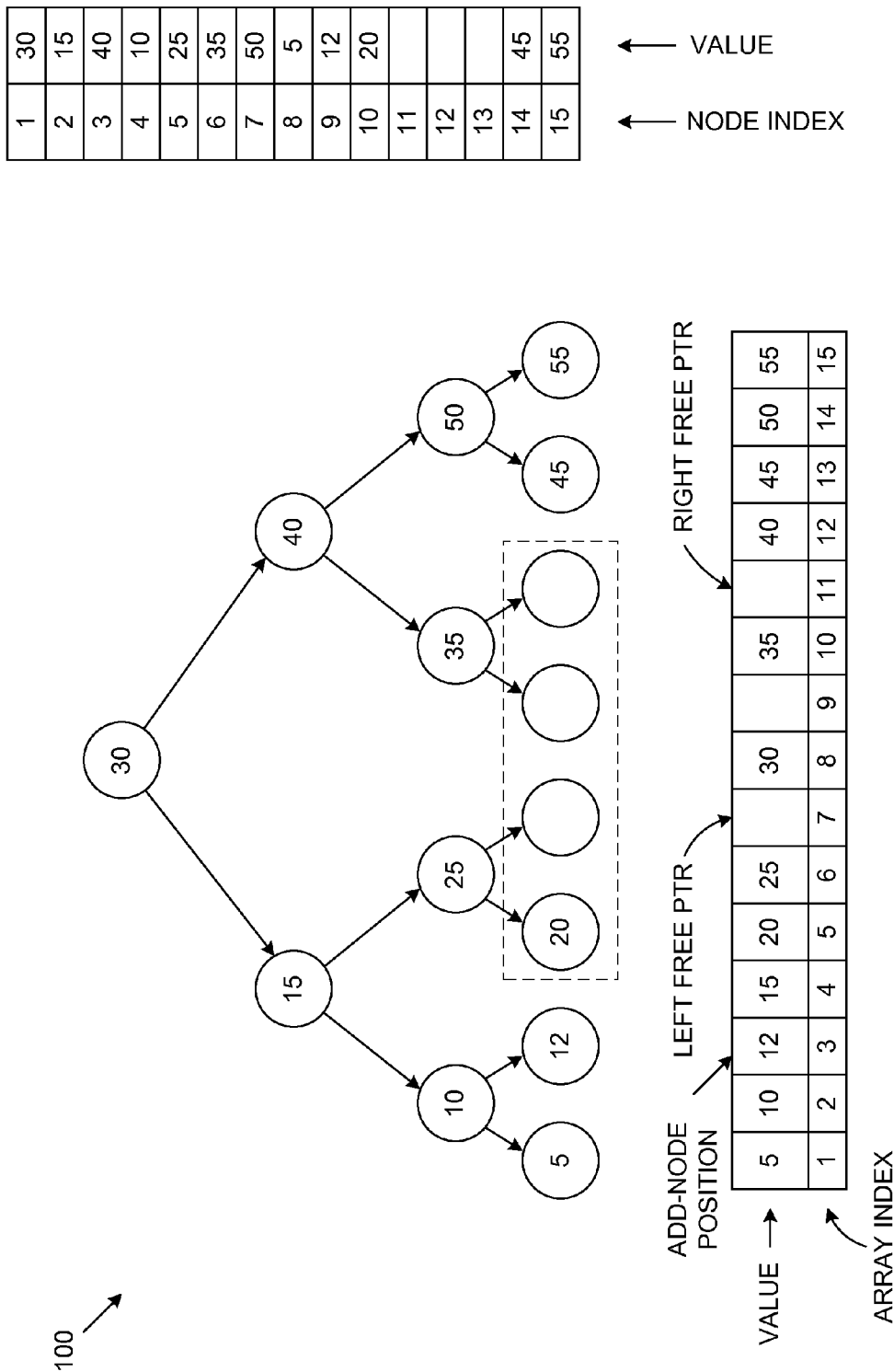

As illustrated by FIG. 13, bubble movements are performed, wherein the entry '20' located at array index '4' is written to the nearest-free pointer location (i.e., array index '5'), and the entry '15' located at array index '3' is then written into the location originally associated with the entry '20' (i.e., array index '4'). These bubble movements are illustrated by arrows 1301 and 1302 in FIG. 13. The resulting BSE instance is illustrated in FIG. 14, which shows that the 'hole' at the nearest-free pointer location (array index '5', node index '10') has been filled, and a new 'hole' has been created at the add-node position (array index '3', node index '9'). As illustrated in FIG. 15, the new element '12' is added at the add-node position (array index '3'), and the left free pointer is updated to correspond with array index '7'.

As illustrated by FIGS. 14-15, the node index values are updated at the same time as the array index values, using array-to-node (A2N) index conversions. Thus, when the entry '20' located at array index '4' is written to the nearest-free pointer location (array index '5'), this entry '20' is also written to the corresponding node index '10'. Similarly, when the entry '15' is written to array index '4', this entry '15' is also written to the corresponding node index '2'. Finally, when the entry '12' is written to array index '3', this entry '12' is also written to the corresponding node index '9'. By updating the node index in this manner, searches can be performed without delay (using the node index), even if the process of adding an element to the BSE instance 100 has been started, but not completed. However, the process of adding the element to the BSE instance may be delayed while search operations are being performed. To avoid such delay, two port memories may be used to store the entries of BSE instance 100, wherein one port is dedicated to implementing search operations, and the other port is dedicated to implementing add operations (as well as delete operations, described below), thereby ensuring that the add (and delete) operations are not delayed by the search operations (and vice versa). Note that a copy of the new element being added is maintained in a register, thereby allowing this new element to be compared with search data during any concurrent search operation.

It is important to note that the manner in which the new element is added to the BSE instance necessarily results in a balanced binary tree structure at the end of the add-node process.

Deleting an Element from the BSE

The deletion of an element from BSE instance 100 will now be described. Deleting an element from a BSE instance includes the following steps, in accordance with one embodiment of the present invention.

Identify the node position where the element to be deleted is located. This node position is designated as the del-node position.

If the del-node position is adjacent (in node index value) to the left free pointer or the right free pointer, just delete the element.

Otherwise, find the distance from the del-node position to the left free pointer, and the distance from the del-node position to the right free pointer.

Between the left free pointer and the right free pointer, the pointer with the least distance to the del-node position is defined as the nearest free pointer.

The del-node position currently represents a 'hole' that must be moved to the "bottom level", while maintaining the criteria that all the holes at the "bottom level" remain together.

Starting from the del-node position a bubble movement of the elements of the BSE instance is performed until reaching the node adjacent to the nearest free pointer. This is analogous to hole-drift in semiconductors.

The node adjacent to the nearest free pointer now becomes the left free pointer or right free pointer depending on whether the nearest free pointer was the left free pointer or the right free pointer, respectively.

Figure 16:
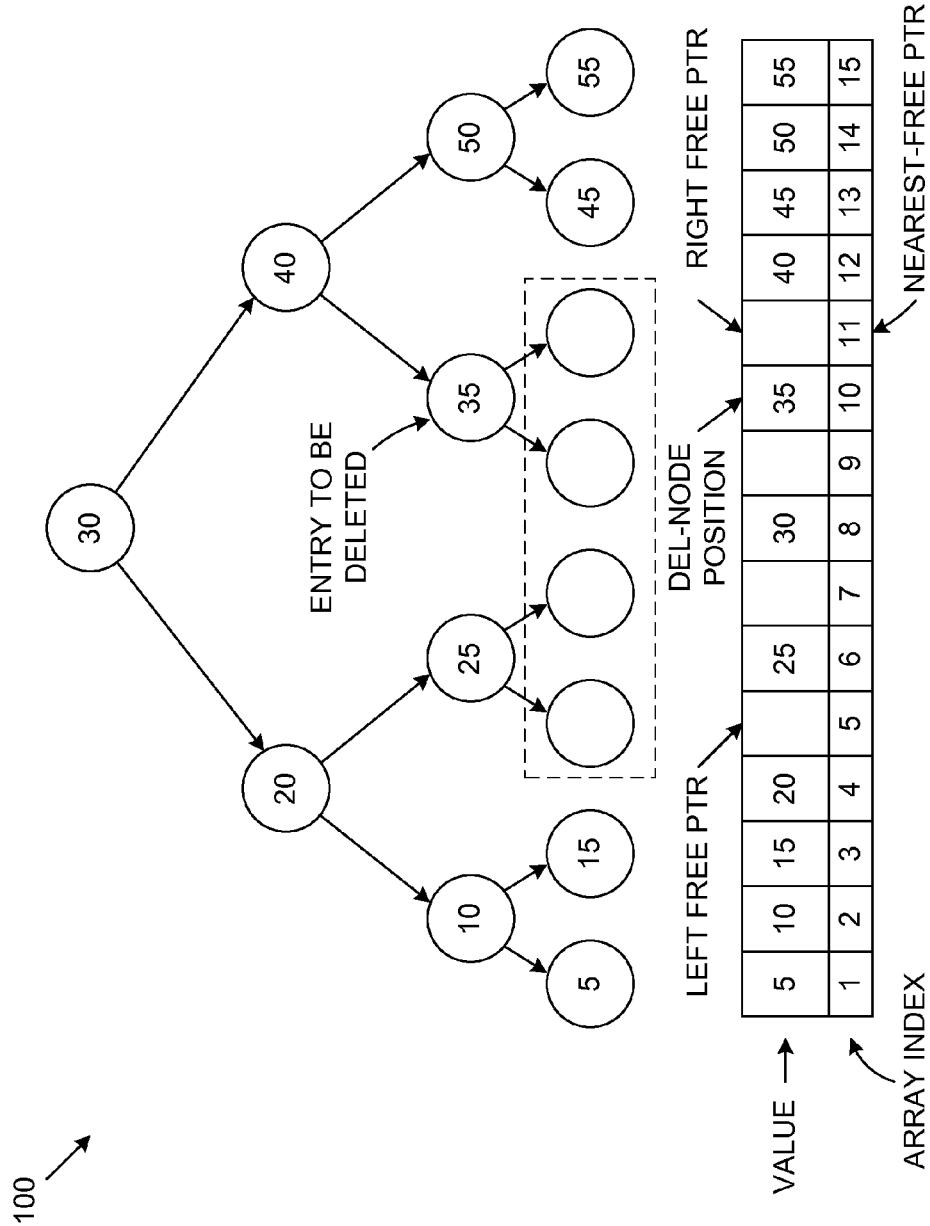
FIGS. 16, 17, and 18 are block diagrams of a BSE instance during various stages of a delete-node operation in accordance with one embodiment of the present invention.
Figure 17:
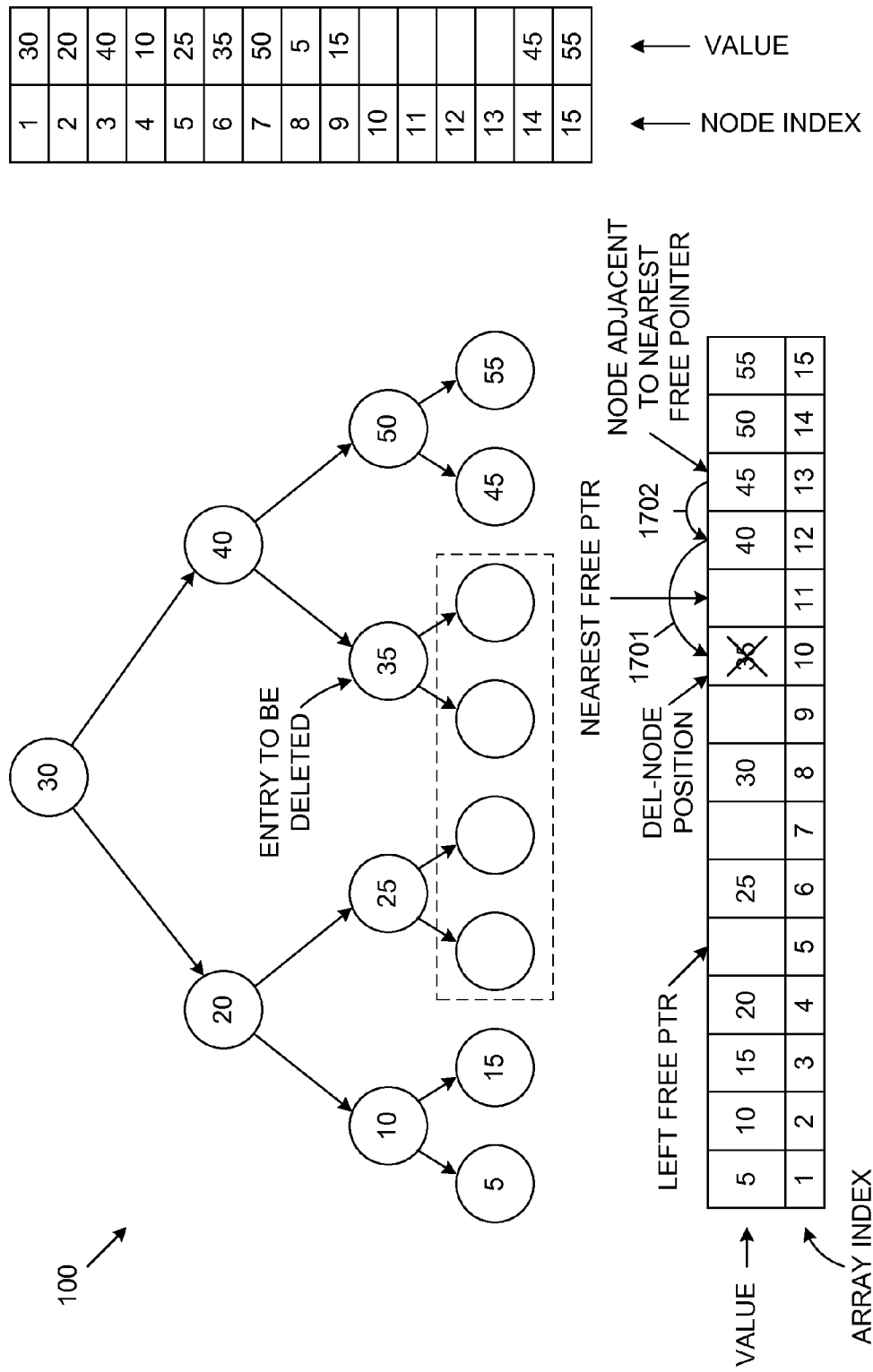
Figure 18:
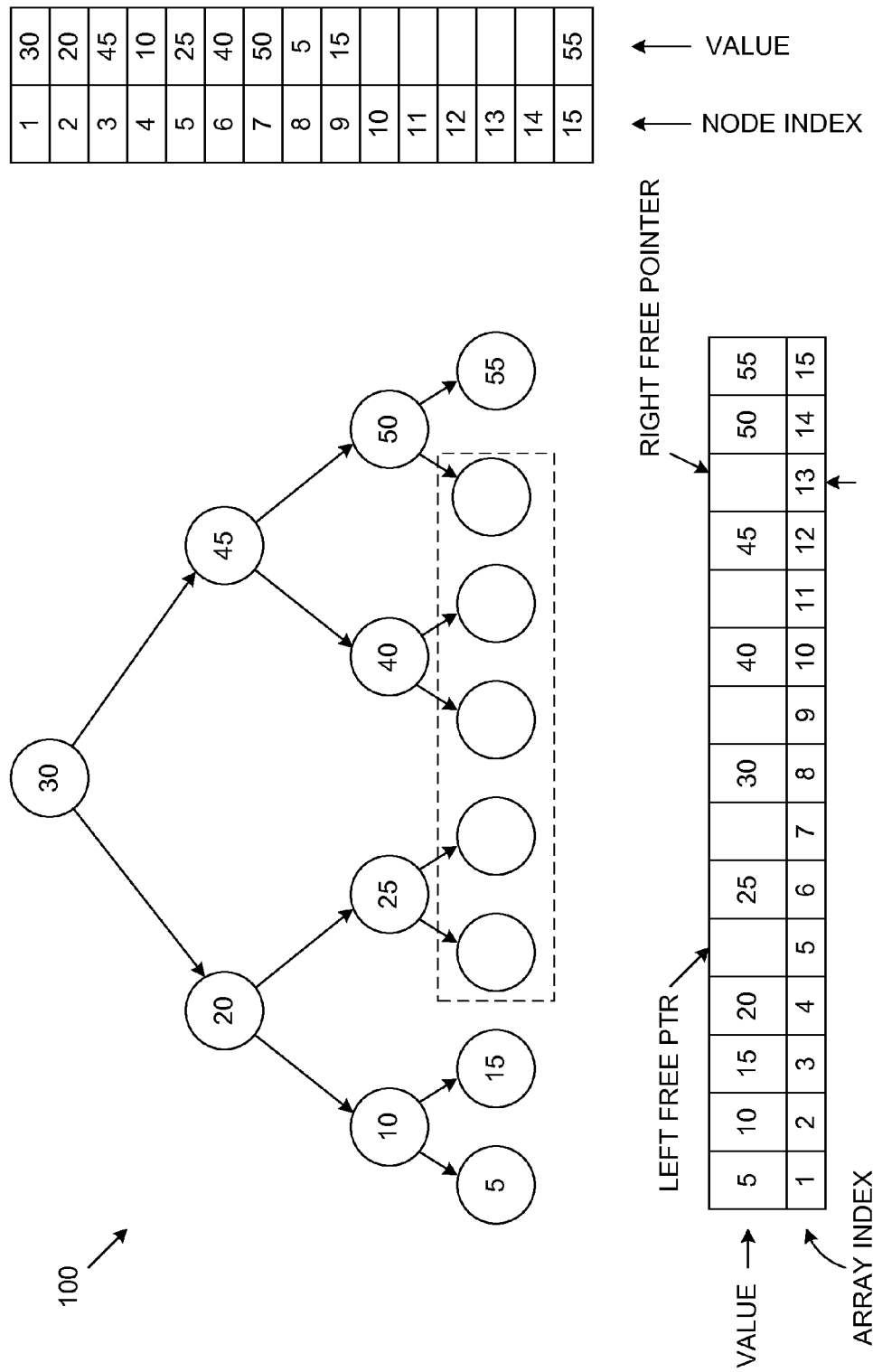

FIGS. 16-18 illustrate the manner in which the element having a value of '35' is deleted from the BSE instance 100 in accordance with one embodiment of the present invention.

First, it is determined that the element to be deleted '35' is located at the valid node identified by node index '6'. This determination is made by performing a search operation in BSE instance 100 (using the node index view), wherein the element '35' is used as the search data. A node-to-array (N2A) index conversion is performed, converting the node index '6' to the array index '10'. This is the del-node position, as illustrated by FIG. 16.

As illustrated by FIG. 16, the del-node position (node index '6') is not adjacent to the left free pointer (node index '10') or the right free pointer (node index '13'). Note that if the del-node position was node index '9', the del-node position would be adjacent to the left free pointer at node index '10', and the entry at node index '9', as well as the corresponding entry at array index '3' could simply be deleted (with the left free pointer being updated to correspond with array index '3' and node index '9'), thereby completing the delete operation. Similarly, if the del-node position was node index '14', the del-node position would be adjacent to the right free pointer at node index '13', and the entry at node index '14', as well as the corresponding entry at array index '13' could simply be deleted (with the right free pointer being updated to correspond with array index '13' and node index '14'), thereby completing the delete operation.

The distance between the del-node position (array index '10') and the right free pointer (array index '11') is less than the distance between the del-node position (array index '10') and the left free pointer (array index '5'). Thus, the right free pointer (array index '11') is defined as the nearest free pointer in the described example. As described below, a 'hole' must be created adjacent to this nearest free pointer. Because the nearest-free pointer is located at node index '13' (i.e., array index '11'), the 'hole' must be created at adjacent node index '14' (i.e., array index '13').

As illustrated by FIG. 17, a bubble movement is performed, wherein the entry '40' located at array index '12' is written to the del-node position (i.e., array index '10' and node index '6'). The entry '45' located at array index '13' is then written into the location originally occupied by entry '40' (i.e., array index '12', node index '3'). These bubble movements are illustrated by arrows 1701 and 1702 in FIG. 17. The entry adjacent to the nearest free pointer is then deleted (i.e., array index '13' and node index '14' are made 'null'). This entry (i.e., array index '13', node index '14') is then designated as the new right free pointer. The resulting BSE tree structure is illustrated in FIG. 18, which shows that the 'hole' created by the deletion of the element having a value of '35' has been moved to the bottom level, such that all 'holes' in the bottom level are continuous and adjacent to one another. Thus, the manner in which the element is deleted from the BSE instance necessarily results in a balanced binary tree at the end of the deleting process. By updating the node index in the above-described manner during the delete operation, searches can be performed without delay (using the node index), even if the process of deleting an element from the BSE has been started, but not completed. The process of deleting the element from the BSE instance may be delayed while the searches are being performed. However, as described above, this delay can be eliminated by using two port memories (i.e., one port dedicated for searches and the other port dedicated to add-delete operations).

Figure 19:
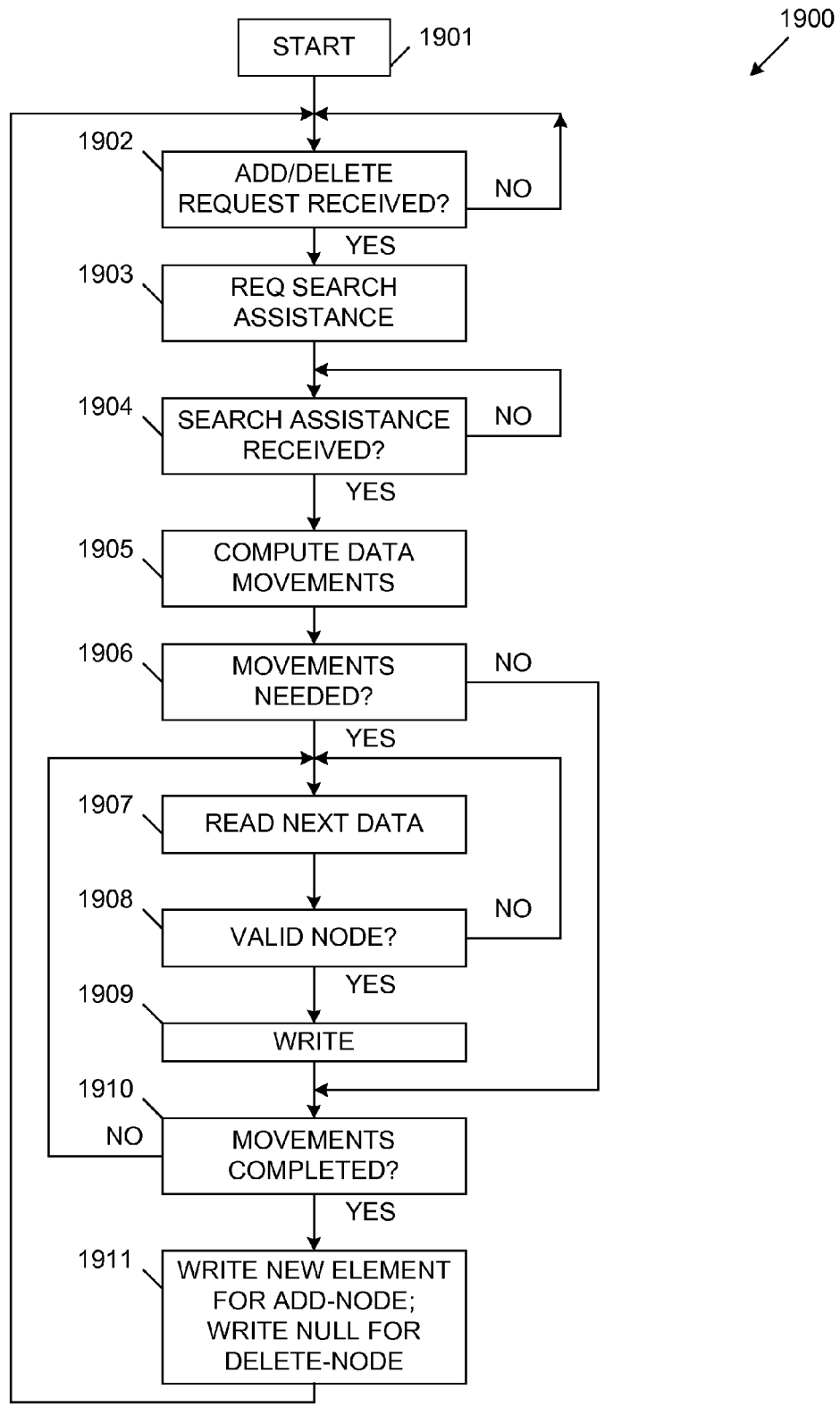
FIG. 19 a flow chart illustrating BSE add-node and BSE delete-node operations in accordance with one embodiment of the present invention.

FIG. 19 is a block diagram of an add/delete flow chart 1900 in accordance with one embodiment of the present invention. The process begins at step 1901 and proceeds to step 1902, wherein it is determined whether a new add-node or delete-node request has been received. If no new request has been received (step 1902, NO branch), processing returns to step 1902. If a new add-node or delete-node request has been received (step 1902, YES branch), processing proceeds to step 1903, wherein search assistance is requested. Processing proceeds to from step 1903 to step 1904, wherein the process waits for search assistance. If no search assistance is received (Step 1903 NO branch), processing loops back to step 1904. When search assistance is received (Step 1904, YES branch), processing proceeds to step 1905, wherein a search is performed to identify the add-node position or the delete-node position. Also within step 1905, the required bubble movements associated with the add-node or delete-node request are determined in the manner described above. Processing then proceeds to step 1906. If data movements are not necessary to complete the add-node/delete-node request (step 1906, NO branch), processing jumps ahead to step 1910. As described above, no data movements are required for an add-node operation that specifies the left free pointer or the right free pointer. Similarly, no data movements are required for a delete-node operation that specifies a node adjacent to the left free pointer or the right free pointer. Because no data movements are necessary in these cases, processing proceeds from step 1910 (YES branch) to step 1911. During step 1911, a new element is written to a node specified by the left free pointer or the right free pointer (for an add-node request), or an element is deleted from a valid node adjacent to the left free pointer or the right free pointer (for a delete-node operation). Processing then returns to step 1902.

If data movements are required to implement the add-node/delete-node request (step 1906, YES branch), then processing proceeds from step 1906 to step 1907, wherein the next entry to be moved in accordance with the above-described bubble movements is read. If this entry is not read from a valid node (Step 1908, NO branch), then processing returns to step 1907, wherein the next entry to be moved in accordance with the required bubble movements is read. However, if the entry is read from a valid node (step 1908, YES branch), then processing proceeds to step 1909, wherein the entry read during step 1907 is written to the appropriate node of the BSE instance (in accordance with the above-described bubble movements). If the required bubble movements are not completed by the write operation performed during step 1909 (step 1910, NO branch), then processing returns to step 1907, such that the next movement may be implemented by repeating steps 1907 to 1909. If the required bubble movements are completed by the write operation performed during step 1909 (step 1910, YES branch), the processing continues to step 1911, wherein a new element is written (for an add-node operation) or an element is deleted (for a delete-node operation). Processing then returns to step 1902.

Add/Delete Latency

Figure 20:
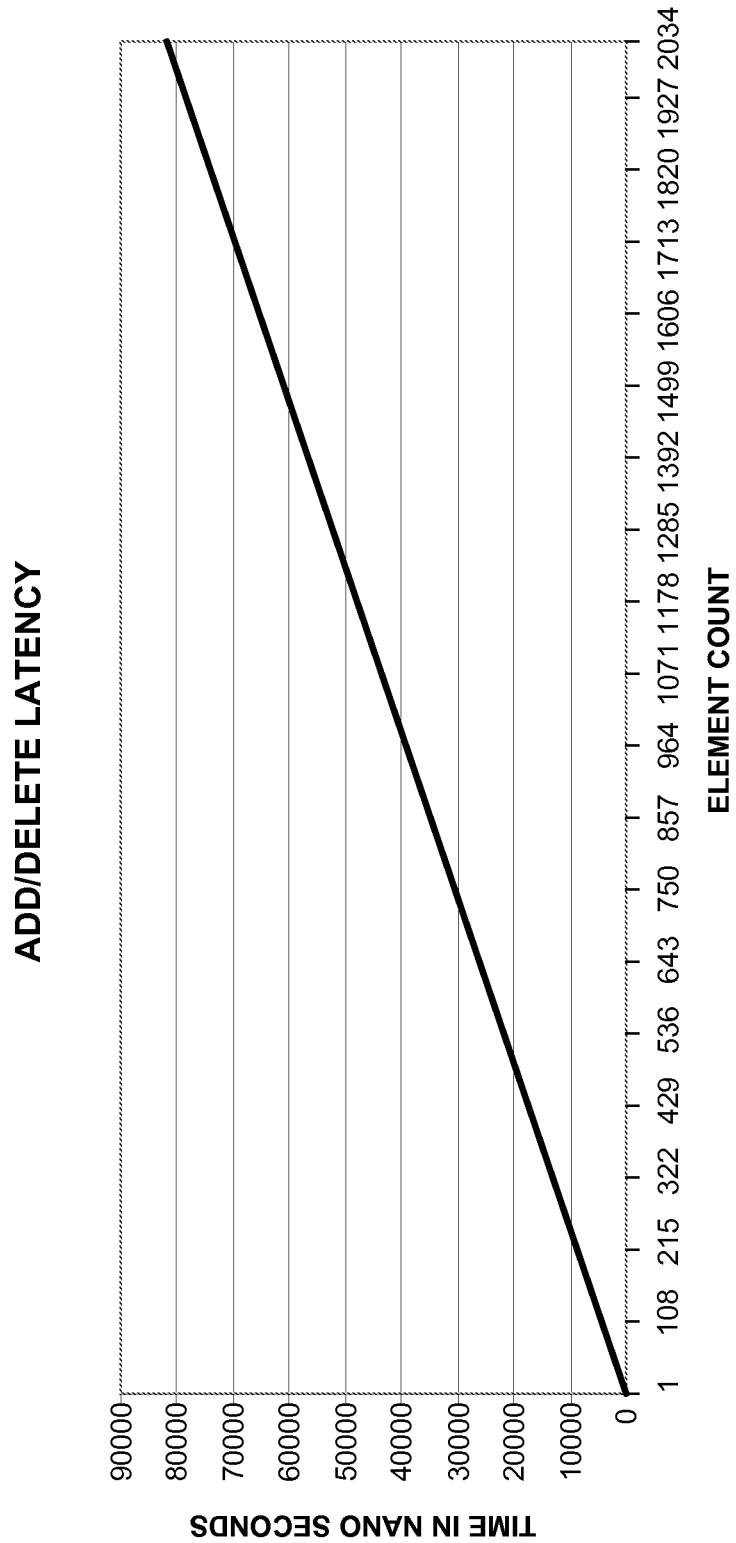
FIG. 20 is a graph illustrating worst case add/delete latency for a BSE instance having 2K entries in accordance with one embodiment of the present invention.

FIG. 20 is a graph illustrating worst case add/delete latency for a BSE instance having the capacity to store 2K entries (hereinafter referred to as a BSE-2K instance) in accordance with one embodiment of the present invention. More specifically, the graph of FIG. 21 illustrates the manner in which the worst case add/delete latency (in time) varies with respect to the number of valid nodes (actual entries) in the BSE-2K instance.

Figure 21:
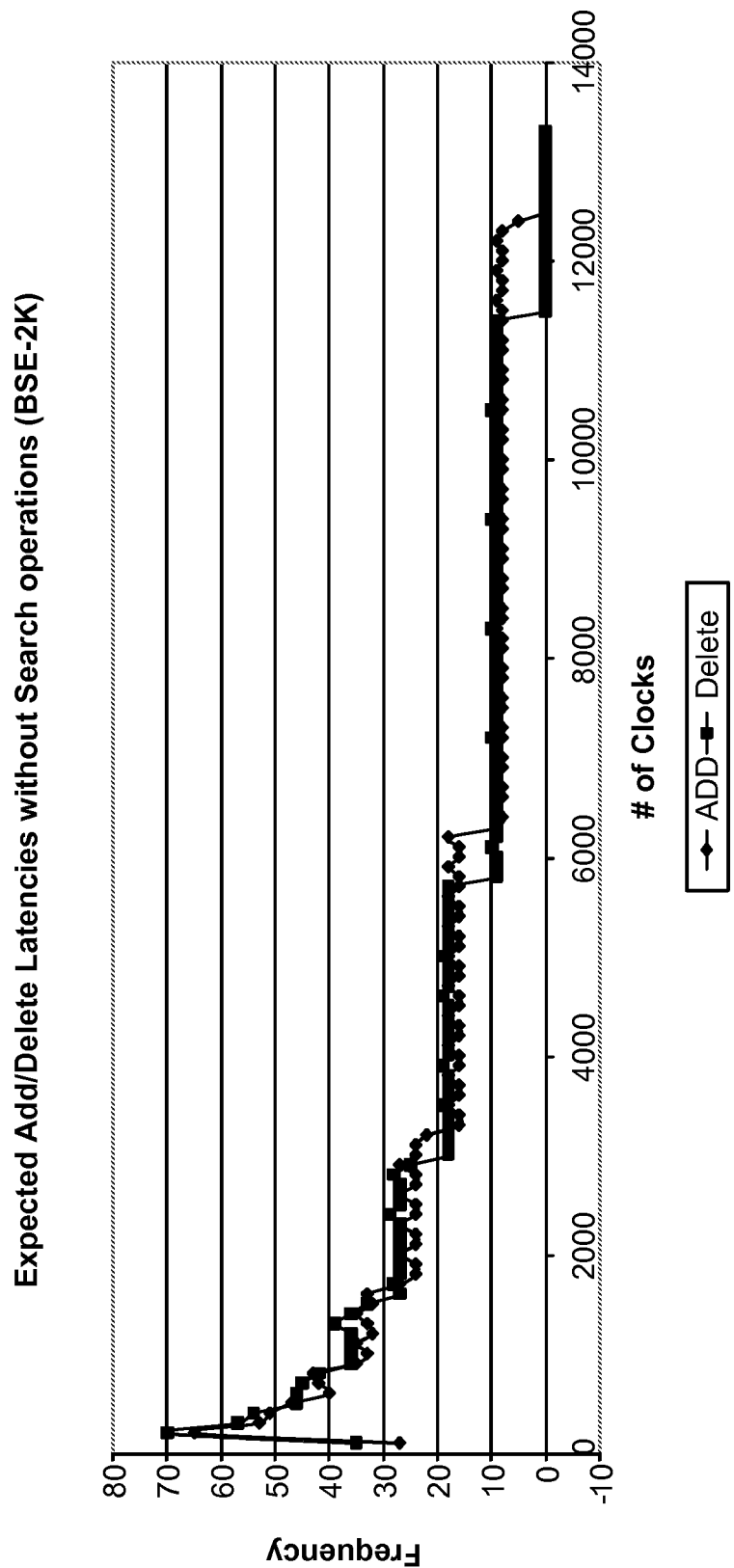
FIG. 21 is a graph illustrating expected add/delete latency without parallel search operations for a BSE instance having 2K entries in accordance with one embodiment of the present invention.

FIG. 21 is a graph illustrating expected add/delete latency without parallel search operations for a BSE-2K instance in accordance with one embodiment of the present invention. More specifically, the graph of FIG. 22 illustrates, for random entries, the frequency with which the expected add/delete latency would require a particular number of clock cycles.

Figure 22:
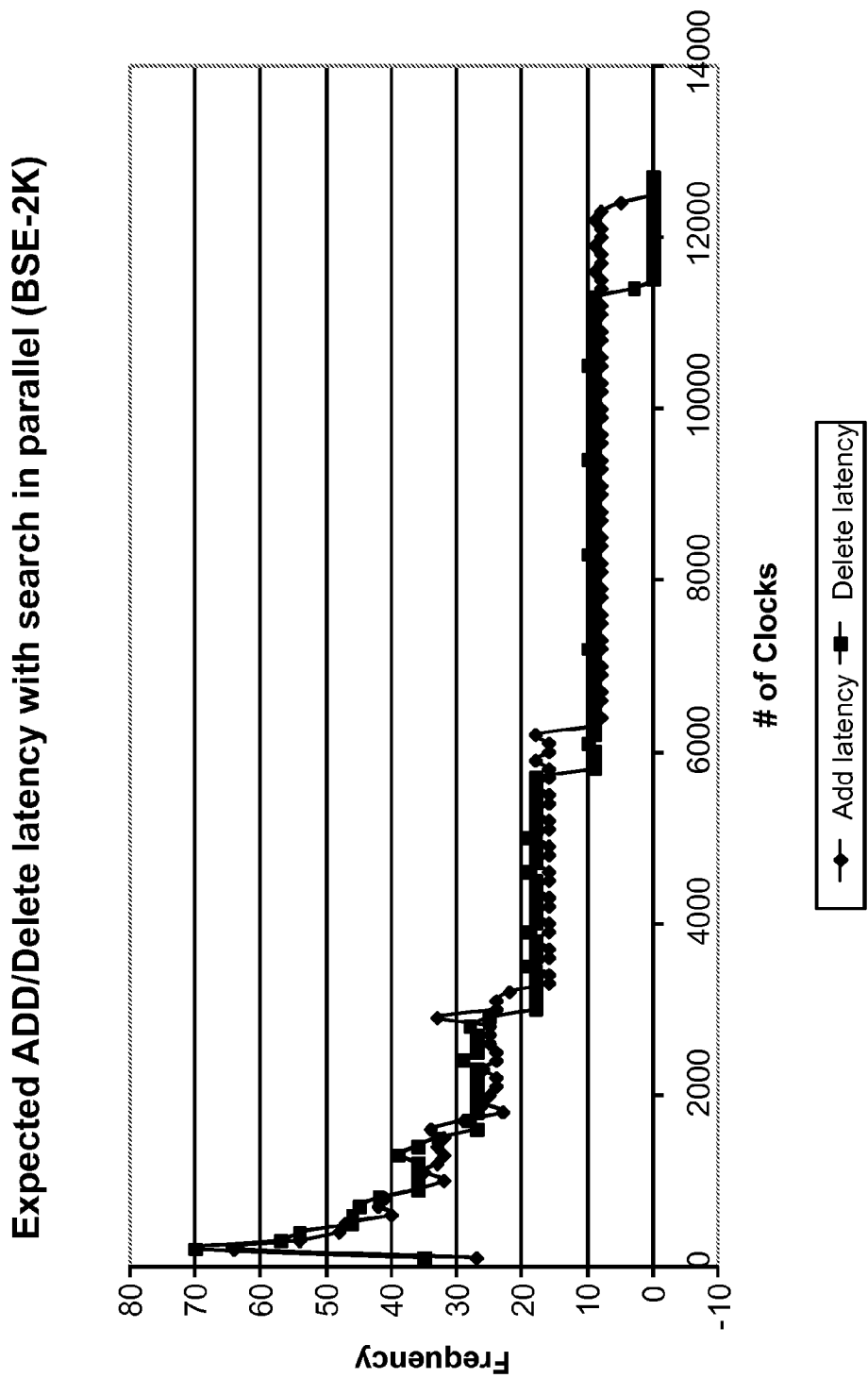
FIG. 22 is a graph illustrating expected add/delete latency with parallel search operations for a BSE instance having 2K entries.
Figure 23:
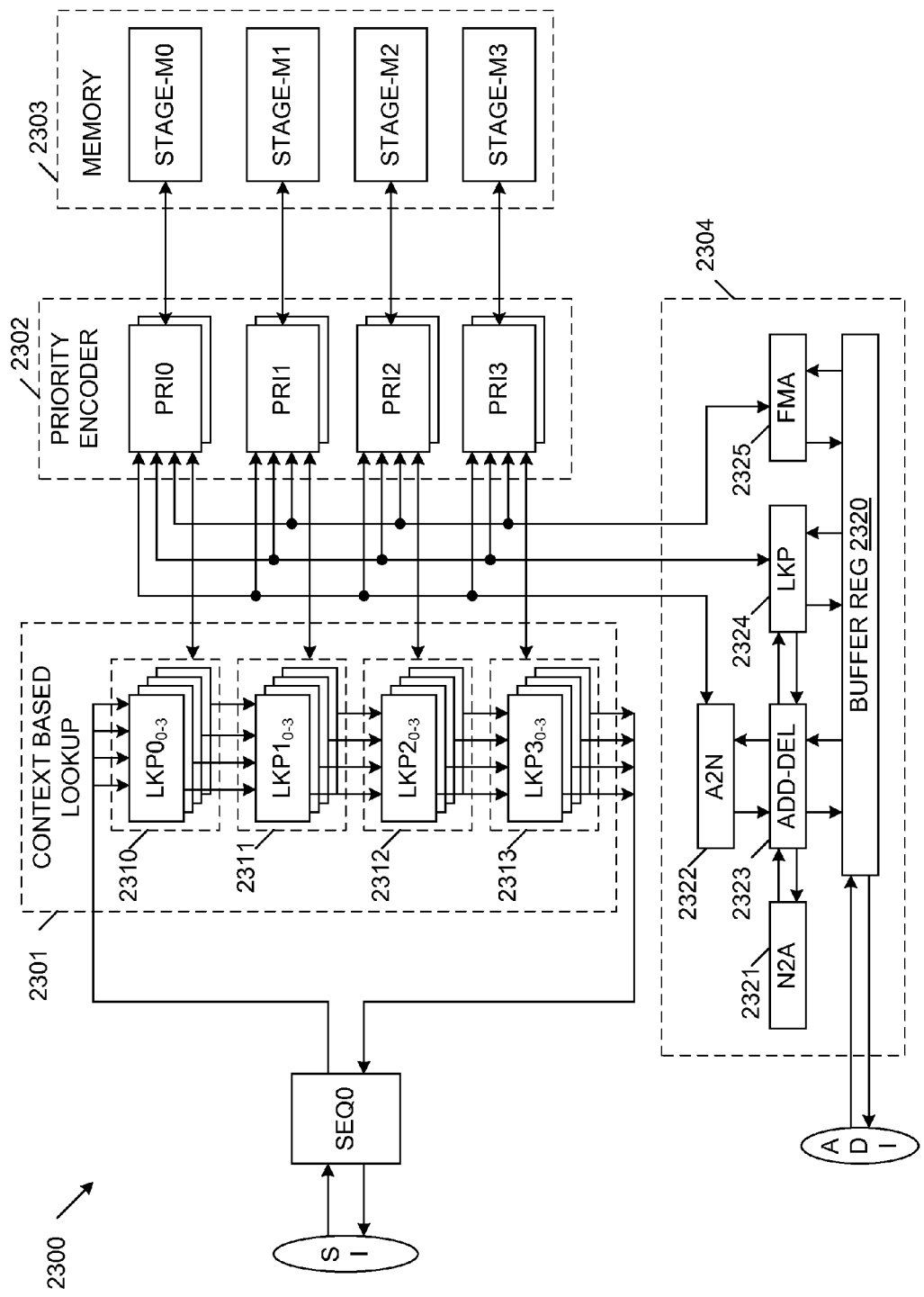
FIG. 23 is a block diagram of a pipelined system for accessing a BSE instance in accordance with one embodiment of the present invention.

FIG. 22 is a graph illustrating expected add/delete latency with parallel search operations for a BSE-2K instance in accordance with one embodiment of the present invention. More specifically, the graph of FIG. 23 illustrates, for random entries, the frequency with which the expected add/delete latency would require a particular number of clock cycles.

Scaling the BSE Instance

The BSE instance 100 can be scaled as desired to have different numbers of entries. For example, a BSE instance may have 512 entries (9 levels), 1024 entries (10 levels), 2K entries (11 levels), or 4K entries (12 levels). In general, a BSE instance having N entries is referred to as BSE-N instance. Thus, a BSE instance having 4K entries may be referred to as a BSE-4K instance.

Table 1 illustrates the search latency, search throughput and layout area of a BSE-4K instance, a BSE-32K instance and a BSE-256K instance in accordance with one embodiment of the present invention.

TABLE 1

| Elements | Search Latency (clock cycles) | Throughput | Logic Area (sq um in 65 nm process) |
|---|---|---|---|
| 4K | 16 | 1 search/1 clock | 172,000 |
| 32K | 20 | 1 search/1 clock | 185,000 |
| 256K | 24 | 1 search/1 clock | 200,000 |

Pipelined Operation of a BSE Instance

FIG. 23 is a block diagram of a system 2300 for implementing a BSE instance in accordance with one embodiment of the present invention. In general, system 2300 performs pipelining of successive search operations within the BSE instance, whereby search results can be provided at a rate of one search result per clock cycle (after an initial search latency). System 2300 includes search interface SI, high-speed add/delete interface ADI, sequencer SEQ0, context-based look-up block 2301, priority encoder block 2302, memory block 2303 and add/delete block 2304. Context-based look-up block 2301 includes look-up block groups 2310-2313. Look-up block groups 2310, 2311, 2312 and 2313, in turn, include corresponding look-up blocks $LKP0_0$-$LKP0_3$, $LKP1_0$-$LKP1_3$, $LKP2_0$-$LKP2_3$ and $LKP3_0$-$LKP3_3$, respectively. Priority encoder block 2302 includes priority encoders PRI0-PRI3. Memory block 2303 includes memory stages M0-M3. Add-delete block 2304 includes a buffer register 2320, node-to-array (N2A) conversion block 2321, array-to-node (A2N) conversion block 2322, add/delete state machine 2323, look-up block 2324 and firmware access block 2325.

Sequencer SEQ0 receives packets that include search data from search interface SI. Sequencer SEQ0 provides the search data to look-up block group 2310 of context-based look-up 2301. More specifically, the search data is initially provided to look-up block $LKP0_0$ within look-up block group 2310. In response, look-up block $LKP0_0$ retrieves the entries of a level S0 super node of the BSE instance from memory stage M0 (via priority encoder PRI0). For example, the look-up block $LKP0_0$ may retrieve the seven entries of the level S0 super node 701 of FIG. 8. Note the priority encoder 2302 will grant priority to context-based look-up block 2301 (over add/delete block 2304).

Look-up block $LKP0_0$ then performs a search operation using the search data and the retrieved entries of the super node. In response, look-up block $LKP0_0$ determines the next super node (in super node level S1) to be searched (assuming that a match was not detected in the initially accessed super node). For example, look-up block $LKP0_0$ may determine that the search should proceed in the super node 805 in super node level S1 (see, FIG. 8). Look-up block $LKP0_0$ transfers this information to look-up block $LKP1_0$ in the adjacent look-up block group 2311.

In response, look-up block $LKP1_0$ retrieves the seven entries of the indicated super node 805 from memory stage M1, via priority encoder block PRI1. Look-up block $LKP1_0$ then performs a search operation using the search data and the retrieved entries of the super node 805. In response, look-up block $LKP1_0$ determines the next super node (in super node level S2) to be searched (assuming that a match was not detected in the accessed super node 805). Look-up block $LKP1_0$ transfers this information to look-up block $LKP2_0$ in the adjacent look-up block group 2312. The above-described process is repeated by look-up block $LKP2_0$. The result from look-up block $LKP2_0$ is provided to look-up block $LKP3_0$, and the process is repeated again for super node level S3, (if a match was not detected in the accessed super node of super node level S2). Look-up block $LKP3_0$ then returns the final search result to sequencer SEQ0. Sequencer SEQ0 then forwards the final search result to search interface SI. In this manner, context based look-up block 2301 performs a search operation of four levels of super nodes (or 3*4=12 levels of nodes), which is the equivalent of a BSE instance having a capacity of 4K entries (i.e., a BSE-4K instance). Note that if a match is detected by one of the look-up blocks $LKP0_0$-$LKP3_0$, the subsequent look-up blocks in the series need not perform the above described search operations, but may simply forward the final search result.

As illustrated in FIG. 23, context based look-up block 2301 includes four look-up blocks in each of the look-up block groups 2310-2313. This configuration allows pipelining of searches, whereby one final search result may be output by context based look-up block 2301 during each clock cycle. Immediately after look-up block $LKP0_0$ retrieves the entries of a level S0 super node from stage M0 of memory block 2303 to initiate a first search, look-up block $LKP0_1$ retrieves the entries of a level S0 super node from stage M0 of memory block 2303 to initiate a second search (in response to a second search value provided by sequencer SEQ0). Immediately thereafter, look-up block $LKP0_2$ retrieves the entries of a level S0 super node from stage M0 of memory block 2303 to initiate a third search (in response to a third search value provided by sequencer SEQ0). Immediately thereafter, look-up block $LKP0_3$ retrieves the entries of a level S0 super node from stage M0 of memory block 2303 to initiate a fourth search (in response to a fourth search value provided by sequencer SEQ0). Immediately thereafter, processing returns to look-up block $LKP0_0$, which retrieves the entries of a level S0 super node from stage M0 of memory block 2303 to initiate a fifth search (in response to a fifth search value provided by sequencer SEQ0). This sequence continues, with the look-up blocks $LKP0_1$-$LKP0_3$ sequentially accessing memory stage M0 during successive clock cycles. Upon receiving the retrieved entries of the level S0 super node, each of the look-up blocks $LKP0_1$-$LKP0_3$ initiate search operations as described above, whereby these search operations proceed in parallel within look-up blocks $LKP0_1$-$LKP0_3$.

The results of the search operations performed by look-up blocks $LKP0_0$, $LKP0_1$, $LKP0_2$ and $LKP0_3$ are sequentially transferred to corresponding look-up blocks $LKP1_0$, $LKP1_1$, $LKP1_2$ and $LKP1_3$, respectively, during consecutive clock cycles. As soon as each look-up block ($LKP0_0$, $LKP0_1$, $LKP0_2$, $LKP0_3$) completes its search operation, this look-up block may initiate a new (e.g., fifth, sixth, seventh, eighth) search. In this manner, look-up blocks $LKP0_0$, $LKP0_1$, $LKP0_2$ and $LKP0_3$ may continuously and sequentially initiate new searches (and provide search results).

Upon receiving the search results from look-up blocks $LKP0_0$, $LKP0_1$, $LKP0_2$ and $LKP0_3$, the corresponding look-up blocks $LKP1_0$, $LKP1_1$, $LKP1_2$ and $LKP1_3$, sequentially retrieve the specified level S1 super node entries from stage M1 of memory block 2303, and perform search operations in the manner described above.

The results of the search operations performed by look-up blocks $LKP1_0$, $LKP1_1$, $LKP1_2$ and $LKP1_2$ are sequentially transferred to corresponding look-up blocks $LKP2_0$, $LKP2_1$, $LKP2_2$ and $LKP2_3$, respectively, during consecutive cycles. In response, look-up blocks $LKP2_0$, $LKP2_1$, $LKP2_2$ and $LKP2_3$, sequentially retrieve the specified level S2 super node entries from stage M2 of memory block 2303, and perform search operations in the manner described above.

The results of the search operations performed by look-up blocks $LKP2_0$, $LKP2_1$, $LKP2_2$ and $LKP2_3$ are sequentially transferred to corresponding look-up blocks $LKP3_0$, $LKP3_1$, $LKP3_2$ and $LKP3_3$, respectively, during consecutive cycles. In response, look-up blocks $LKP3_0$, $LKP3_1$, $LKP3_2$ and $LKP3_3$, sequentially retrieve the specified level S3 super node entries from stage M3 of memory block 2303, and perform search operations in the manner described above.

As a result of this pipelining, search results may be sequentially provided by look-up blocks $LKP3_0$, $LKP3_1$, $LKP3_2$ and $LKP3_3$ during consecutive clock cycles. Once the pipeline is full, search results may continuously be provided from context based look-up block 2301 to sequencer SEQ0 during consecutive clock cycles. In this manner, the super node structure, as implemented in combination with system 2300, advantageously reduces the search latency of the associated BSE instance.

Add/delete block 2304 controls the adding and deleting of the entries of the BSE in the manner described above. Add/delete control block 2304 includes a buffer register 2320 that receives the add/delete requests from add-delete interface ADI. These add/delete requests are provided to add/delete state machine 2323 and look-up block 2324. Add/delete state machine 2323 maintains the N2A conversion block 2321 and the N2A conversion block 2322 in the manner described above. Look-up block 2324 performs the search operations necessary to implement the add/delete operations. More specifically, look-up block 2324 performs a search to identify the location where an entry should be added/deleted (i.e., the add-node position or the delete-node position). In response, add/delete state machine 2323 determines the manner in which the BSE entries should be modified to accomplish the requested add/delete operation. Add/delete state machine 2323 then controls look-up block 2324 to modify the entries of the memory block 2303 in the determined manner. As described above, priority encoder 2302 gives priority to accesses by context based look-up block 2301, so look-up block 2324 may experience delays in modifying memory block 2303. Firmware access block 2325 provides a means for modifying memory block 2303, which overrides the above-described functions of system 2300. The firmware access block 2325 can optionally perform the computations needed to add-delete elements. In this case, firmware access block 2325 disables the add/delete state machine 2323 and performs add-delete operations with DMA hardware assistance using FMA commands.

BSE Versus CAM

Table 2 below compares the performance of a BSE instance of the present invention with the performance of a conventional CAM structure.

TABLE 2

| Feature | BSE | CAM |
| --- | --- | --- |
| Search Throughput without Add/Del/Mod | 1 search per clock | 1 search per clock |
| Search Latency | 16 clocks | 2 clocks |
| Add Latency | 10 clocks to 2047 * 5 clocks | 1 clock |
| Clocks consumed by Add/Del/Mod | 1 to 2047/3 clocks | 1 clock |
| Add Effect latency | 5 clocks | 2 clocks |

Table 3 below compares the estimated area requirements of BSE instances in accordance with the present invention with CAM structures of similar capacity.

TABLE 3

| # Entries | CAM Area (mm$^2$) | BSE Area (mm$^2$) | CAM Area/BSE Area |
|---|---|---|---|
| 8192 | 2.608 | 0.2409 | 10.83 |
| 4096 | 1.304 | 0.1895 | 6.88 |
| 2048 | 0.652 | 0.1027 | 6.35 |
| 1024 | 0.345 | 0.0499 | 6.91 |
| 128 | 0.053 | 0.0183 | 2.90 |

Table 4 below compares the estimated power requirements of BSE instances in accordance with the present invention with CAM structures of similar capacity. Note that SIDD is the static current associated with a search operation.

TABLE 4

| # Entries | CAM SIDD (mA) | BSE SIDD (mA) | CAM SIDD/BSE SIDD |
|---|---|---|---|
| 8192 | 392 | 2.42 | 162.0 |
| 4096 | 196 | 3.87 | 50.6 |
| 2048 | 98 | 2.04 | 48.0 |
| 1024 | 53 | 0.95 | 55.8 |
| 128 | 9 | 0.21 | 42.9 |

As illustrated by Table 2 above, the CAM holds an advantage over the BSE instance of the present invention in terms of search latency, and add/delete latencies. However, as illustrated by Tables 3 and 4 above, the BSE instance of the present invention has significantly lower area requirements and significantly lower power consumption. This is due to the fact that the BSE instance is entirely implemented with RAM-based memory cells. The advantages of the BSE instance of the present invention in terms of area and power requirements become greater as the number of entries increase. It would therefore be desirable to replace a conventional CAM with a BSE instance of the present invention in applications where the add latency is not critical, applications where the search latency is not critical and applications where low power and/or area requirements are important.

Creating a Large BSE with Parallel BSE Instances

Figure 24:
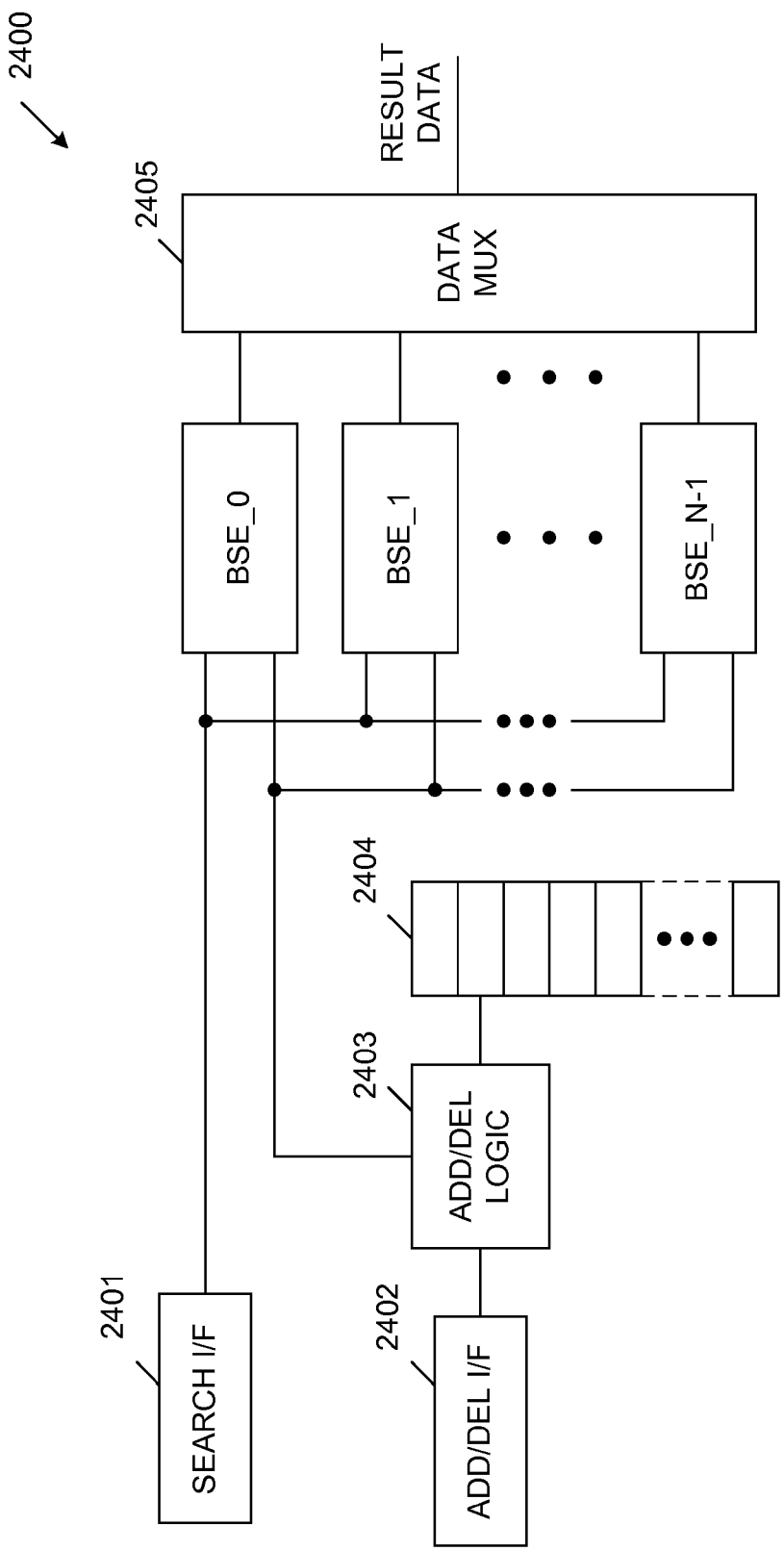
FIG. 24 is a block diagram of a BSE structure that includes multiple BSE instances operated in parallel to provide a large number of entries, in accordance with another embodiment of the present invention.

FIG. 24 is a block diagram of a BSE structure 2400 in accordance with another embodiment of the present invention, wherein multiple BSE instances are operated in parallel to provide a large number of entries. BSE structure 2400 includes search interface 2401, add/delete interface 2402, add/delete logic 2403, add/delete registers 2404, BSE instances BSE_0 to BSE_N−1, and data multiplexer 2405. Each of the BSE instances BSE_0 to BSE_N−1 is separately operated in the manner described above. In one embodiment, each of the BSE instances BSE_0 to BSE_N−1 has the same capacity (e.g., each of the BSE instances BSE to BSE_N−1 can be a BSE-4K structure). However, it is not necessary for the BSE instances BSE_0 to BSE_N−1 to all have the same capacity. Search operations are initiated through search interface 2401. Add/delete operations are initiated through add/delete interface 2402, and are implemented by add/delete logic 2403. Add/delete operations are performed independently within each of the N BSE instances BSE_0 to BSE_N−1, such that add/delete operations can be simultaneously performed in multiple BSE instances BSE_0 to BSE_N−1. Some of the N BSE instances may be fuller/emptier than others. However, each of the N BSE instances BSE_0 to BSE_N−1 is operated in a manner consistent with the BSE implementation described above (e.g., all free nodes are continuous in a bottom level of the BSE instance). Add/delete registers 2404 are maintained by add/delete logic 2403, and store values necessary to perform add/delete operations to the BSE instances BSE_0 to BSE_N−1. For example, add/delete registers 2404 store the left free pointer and right free pointer associated with each of the N BSE instances BSE_0 to BSE_N−1.

Each entry stored in the N BSE instances BSE_0 to BSE_N−1 is unique, such that a search results in, at most, one matching result. During a search operation, a search data value is applied to all N BSE instances BSE_0 to BSE_N−1 in parallel. One (at most) of the N BSE instances BSE_0 to BSE_N−1 provides a matching result, which is routed through data multiplexer 2405 as the result data. In accordance with one embodiment, N is equal to 256, and each of the BSE instances BSE_0 to BSE_N−1 is a BSE-4K structure, such that the resulting BSE structure 2400 includes one million entries.

Table 5 below sets forth the search latency, throughput and logic area associated with 1 million entry BSE structures implemented by BSE-4K instances and BSE-32K instances.

TABLE 5

| Option | Search Latency (clock cycles) | Throughput | Logic Area (sq um in 65 nm process) |
|---|---|---|---|
| 4K * 256 | 16 | 1 search/1 clock | 172,000 * 256 |
| 32K * 32 | 20 | 1 search/1 clock | 185,000 * 32 |

The advantages of the architecture of BSE structure 2400 include the following. A one million entry BSE structure constructed of 256 BSE-4K instances exhibits: (1) the same add-delete latency as a single BSE-4K instance, (2) the same search latency as a BSE-4K instance, (3) no memory overhead, and (4) a simple architecture.

Longest Prefix Match

The binary decision tree used in the BSE instance of the present invention inherently supports finding the entry with the longest prefix match. Thus, if there is a search data value with a width of 32 bits, and there are four BSE entries, wherein one entry matches the 3 highest bits of the search data (3-bit prefix match), another entry matches the 4 highest bits of the search data (4-bit prefix match), another entry matches the 7 highest bits of the search data (7-bit prefix match), and another entry matches the 18 highest bits of the search data (18-bit prefix match), the BSE search result will identify the entry with 18-bit prefix match (longest prefix match) by traversing the binary decision tree in the manner described above.

IPv4 Longest Prefix Match

The problem of finding an IPv4 (internet protocol version 4) longest prefix match is slightly different. When performing an IPv4 longest prefix match, each entry is associated with a corresponding mask, such that each entry has a prefix length defined by the corresponding mask. An entry is consider to 'match' a search value only if the entire prefix length of the entry matches the corresponding bits of the search value. The distinction between a normal longest prefix match and an IPv4 longest prefix match is described below.

Normal Longest Prefix Match:

If there is one 32-bit entry of the BSE instance that results in a 7-bit prefix match, and another 32-bit entry of the BSE instance that results in a 10-bit prefix match, the entry having the longest prefix match (e.g., the entry that results in the 10-bit prefix match) is always selected as the result.

IPv4 Longest Prefix Match:

Assume that a BSE instance includes two 32-bit entries, one of which is entry 'A' with a mask (prefix) length of 7 bits, and the other of which is entry 'B' with a mask (prefix) length of 14 bits. When performing a search operation, assume that all 7 bits of the prefix of entry 'A' match the corresponding 7 bits of a search value, and further assume that only the first 10 bits of the prefix of entry 'B' match the corresponding 10 bits of the search value (i.e., the 11$^{th}$ bit of entry 'B' does not match the corresponding bit of the search value). In this example, entry 'A' is selected as the result (IPv4 longest prefix match), because all bits associated with of the mask (prefix) length match the corresponding bits of the search value.

LPM BSE Architecture for 1 Million IPv4 Entries

Two architectures are discussed below for implementing IPv4 longest prefix match operations in a BSE structure having 1 million entries. It is understood that these architectures can also be used to implement BSE structures having other numbers of entries in other embodiments. It is anticipated that the present invention can be used to implement an LPM binary search engine having 4 to 8 million entries on a single chip.

Architecture 1

In this architecture, multiple BSEs are operated in parallel. Each of these BSEs may include one or more BSE instances, which are also operated in parallel. Each BSE instance can be configured for any mask length of IPv4. For example, one BSE instance can be configured for mask /15 IPv4 entries (i.e., entries having a mask length of 15-bits). This means that only IPv4 entries associated with mask /15 can be added to this BSE instance. Once a BSE instance has been filled with mask /15 entries, another BSE instance can be configured for the same mask length (i.e., two or more BSE instances may store mask /15 entries). Multiple BSE instances storing entries with the same mask length M may collectively be referred to as a BSE that stores entries of mask length M. Each mask length may have zero, one or more associated BSE instances at any given time, depending on the particular entries stored in the BSE structure.

When an entry needs to be added, the entry is added to a BSE that is already configured for the same mask length. If all of the BSE instances corresponding to a mask length are full, a new BSE instance is configured for the same mask length, and the new entry is added to the newly configured BSE instance. Separate BSE instances can be configured to store mask /1, /2, /3, ... /31, /32 entries, such that each mask length may have one or more corresponding BSE instances.

Searching is performed as follows. The search data is submitted to all of the BSEs in parallel. Within each BSE, the search data is masked to the same mask length associated with the BSE. From the resulting matches, the match with the greatest mask length is selected as the result. This result represents the IPv4 longest prefix match.

Figure 25:
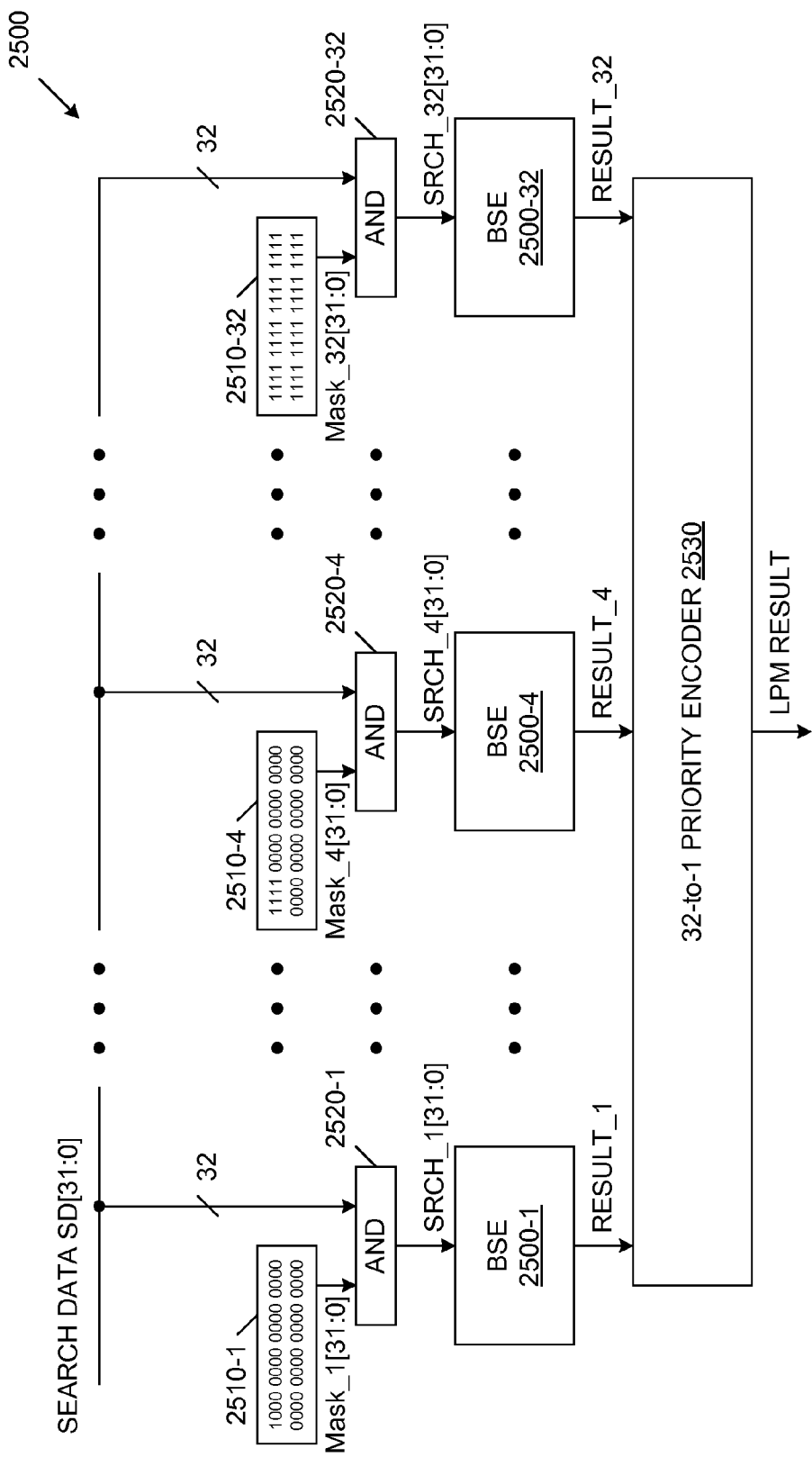
FIG. 25 is a block diagram illustrating a plurality of BSEs which are configured to implement a longest prefix match in accordance with one embodiment of the present invention.

FIG. 25 is a block diagram of a BSE structure 2500, which includes BSEs 2500-1 to 2500-32 in accordance with one embodiment of Architecture 1. Note that only BSEs 2500-1, 2500-4 and 2500-32 are explicitly illustrated in FIG. 25. BSEs 2500-1, 2500-4 and 2500-32 store mask /1, /4 and /32 entries, respectively (i.e., BSEs 2500-1, 2500-4 and 2500-32 implement longest prefix matches of lengths 1, 4 and 32, respectively). In the illustrated example, each of the BSEs 2500-M stores entries having the format: {data[M−1:0], {32−M{1'b0}}}, wherein M is the associated mask length of the BSE. Although only three BSEs are illustrated, it is understood that 32 BSEs (that store entries associated with all 32 mask lengths) are typically be included BSE structure 2500. It is also understood that each of the BSEs 2500-M may include one or more BSE instances, which operate in parallel, in the manner described above.

Each of the BSEs 2500-M is associated with a corresponding mask register 2510-M. Thus, BSEs 2500-1, 2500-4 and 2500-32 are associated with a mask registers 2510-1, 2510-4 and 2510-32, respectively. Mask registers 2510-M store corresponding 32-bit mask values Mask_M[31:0]. For example, mask registers 2510-1, 2510-4 and 2510-32 store mask values Mask_1 [31:0], Mask_4[31:0] and Mask_32[31:0], respectively. Each mask value includes M logic '1' bits followed by (32−M) logic '0' bits, wherein M is equal to the mask length implemented by the corresponding BSE. For example, mask register 2510-4 stores a 32-bit mask value Mask_4[31:0] of [1111 0000 0000 0000 0000 0000 0000 0000], which corresponds with the 4-bit mask length implemented by BSE 2500-4.

Each of the BSEs 2500-M is coupled to a corresponding AND logic block 2520-M. Thus, BSEs 2500-1, 2500-4 and 2500-32 are coupled to AND logic blocks 2520-1, 2520-4 and 2520-32, respectively. Each of the AND logic blocks 2520-M is coupled to a corresponding mask register 2510-M. Each of the AND logic blocks 2520-M receive the mask value Mask_M[31:0] from the corresponding mask register 2510-M.

Each of the AND logic blocks 2520-M also receives the 32-bit IPv4 search data value SD[31:0]. Each of the AND logic blocks 2520-M performs bit-wise logical AND operations on the received search data value SD[31:0] and the corresponding mask values Mask_M[31:0] to provide the masked search data values SRCH_M[31:0] to the corresponding BSE 2500-M. For example, AND logic blocks 2520-1, 2520-4 and 2520-32 provide masked search data values SRCH_1[31:0], SRCH_4[31:0] and SRCH_32[31:0] to BSEs 2500-1, 2500-4 and 2500-32, respectively. The masked search values are generally defined as follows: SRCH_M[31:0]={SD[31: (31−M+1)], {32−M{1'b0}}}.

The entries stored in each BSE 2500-M exhibit the same format as the corresponding masked search values SRCH_M [31:0]. For example, each entry added to BSE 2500-4 has 4 valid prefix bits followed by 28 logic '0' bits. In accordance with one embodiment, each 32-bit IPv4 entry to be added to BSE 2500-4 is logically ANDed with the mask value Mask_4 [31:0] to achieve this result.

Each of the BSEs 2500-M provides a search result RESULT_M in response to the corresponding masked search value SRCH_M[31:0]. For example, BSEs 2500-1, 2500-4 and 2500-32 provide search results RESULT_1, RESULT_4 and RESULT_32, respectively, in response to the masked search data values SRCH_1, SRCH_4, and SRCH_32, respectively. These search results indicate whether or not a match was detected within the corresponding BSE, and the identity of any detected match. A 32-to-1 priority encoder 2530 decodes the search results RESULT_1 to RESULT_32 to identify the longest prefix match, which is provided as the LPM RESULT.

BSE structure 2500 provides a search throughput of one search every clock cycle (assuming the search operations are pipelined in the manner described above in connection with FIG. 23). In an alternate embodiment, dual-port memories (or memories having more than two ports) can be used to implement each of the BSE instances. If dual-port memories are used to implement the BSE instances, the search throughput can be doubled.

In one embodiment, BSE structure 2500 is implemented by 2048 BSE-512 instances, wherein each of these BSE-512 instances is assigned to a corresponding mask length, as required. In a particular embodiment, each of the 32 mask lengths is initially assigned to a corresponding one of the 2048 BSE-512 instances. When a BSE-512 instance for a particular mask length becomes full of entries (as determined by a corresponding counter), an additional BSE-512 instance is assigned to the mask length, such that the BSE structure 2500 grows dynamically, on an as-needed basis. This provides efficient allocation of the BSE instances. The worst case add/delete latency in this embodiment is about 10K clock cycles.

In an alternate embodiment, BSE structure 2500 may be implemented using BSE instances having different capacities (levels). In this embodiment, the smaller BSE instances may be assigned to smaller mask lengths, while larger BSE instances may be assigned to longer mask lengths. This embodiment provides a more efficient use of the provided memory.

In yet another embodiment, custom BSEs are dedicated to particular masks or mask groups. For example, suppose that statistics indicate that approximately five BSE-512 instances will be required to implement mask /16. In this case, five custom BSE-512 instances can be dedicated to mask /16, wherein each of these instances has a width of 16-bits (instead of the full 32-bits). In this example, the size of the resulting BSE structure can be reduced by 16×512×5 memory bits.

Architecture 2 (Iterative Method)

In accordance with a second architecture, multiple BSEs are operated in parallel, wherein each BSE is configured for a mask group that includes a plurality of IPv4 mask lengths. In accordance with one embodiment:

There are 10 mask groups: {3,4,5}, {6,7,8}, {9,10,11}, {12,13,14}, {15,16,17}, {18,19,20}, {21,22,23}, {24,25,26}, {27,28,29} and {30,31,32}.

Each BSE instance can be configured for any one of the mask groups.

Any search is submitted to all BSE instances in parallel, for 3 iterations.

Each BSE instance in 3 iterations searches for the three match prefixes corresponding to its own (configured) mask group.

All the match results for mask /3, from all BSE instances configured for the corresponding mask group, i.e. {3,4,5}, are combined to generate a single mask 3 match result. The same is done for the other masks /4, /5, /6, . . . /32.

Finally, a priority encoder provides the best match, which could be an exact match (EXM) or a longest prefix match (LPM). The best match is the match result from the longest mask.

In accordance with a particular embodiment, all BSE entries are represented in the following format: {data, mask_id}, wherein mask_id is a binary index value of the mask within the mask group. Within each mask group, the smallest mask length has a first binary index value, the intermediate mask length has a second binary index value, and the largest mask length has a third binary index value (wherein the first, second and third binary index values have an ascending order). For example, in mask group {3,4,5}, the mask_id for mask /3 is 2'b00, the mask_id for mask /4 is 2'b01, and the mask_id for mask /5 is 2'b10. Similarly, in mask group {9,10,11}, the mask_id for mask /9 is 2'b00, the mask_id for mask /10 is 2'b01, and the mask_id for mask /11 is 2'b10.

In the present example, data is always represented by a 32-bit value (for IPv4). The M most significant bits of the data represent the entry value (wherein M is the mask length), and the remaining (32−M) bits are '0' values. As described above, each BSE entry includes the 32-bit data and the mask_id value associated with the data. The entries of the BSEs may therefore be represented as follows: {{data[M−1:0], {32−M{1'b0}}}, mask_id}. For example, an entry of '010' for mask /3 is represented as {{010, {29{1'b0}}}, 2'b00}. Similarly, an entry of '00010' for mask /5 is represented as {{00010, {27{1'b0}}}, 2'b10}. The entire entry represents the node value used to implement the add, delete and/or search operations, as described above. Each mask group {a,b,c} stores the entries associated with masks /a, /b and /c.

To perform a longest prefix match operation, a 32-bit search data value is provided in parallel to each of the mask groups. Three successive search operations are performed in each of the mask groups, wherein the three search operations use the three different mask_id values in the manner described below.

Figure 26:
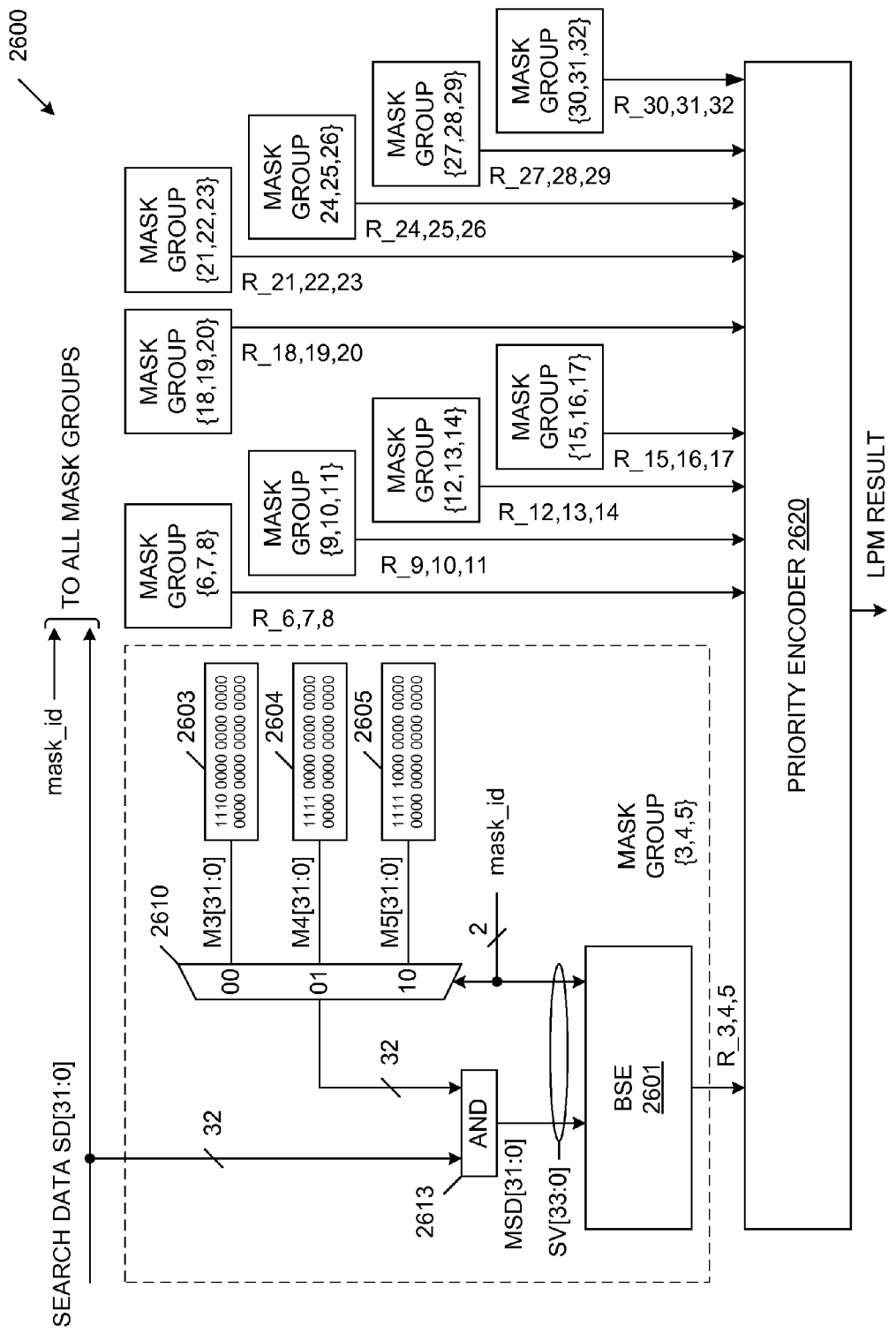
FIG. 26 is a block diagram illustrating a BSE that implements a plurality of mask groups to perform a longest prefix match in accordance with an alternate embodiment of the present invention.

FIG. 26 is a block diagram of a BSE structure 2600 that includes mask groups {3,4,5}, {6,7,8}, {9,10,11}, {12,13,14}, {15,16,17}, {18,19,20}, {21,22,23}, {24,25,26}, {27,28,29} and {30,31,32}, in accordance with one embodiment of the present invention. Although only mask group {3,4,5} is illustrated in detail, it is understood that the remaining mask groups operate in the same manner as mask group {3,4,5} (and in parallel with mask group {3,4,5}).

Mask group {3,4,5} includes BSE 2601, mask registers 2603-2605, multiplexer 2610 and AND logic block 2613. BSE 2601 stores all entries associated with masks /3, /4 and /5. As described above, BSE 2601 may include multiple BSE instances configured in parallel to accommodate a large number of entries in the mask group {3,4,5}. In accordance with a particular embodiment, a search interface (not shown) provides a 32-bit search data value SD[31:0] and a 2-bit mask_id value to all of the mask groups in parallel.

Three mask value registers 2603, 2604 and 2605 store corresponding 32-bit mask values M3, M4 and M5 for masks /3, /4 and /5, respectively. Each 32-bit mask value includes M logic '1' bits in the MSB positions and (32−M) logic '0' bits in the LSB positions, wherein M is the mask length (i.e., the length of the corresponding LPM operation). The mask value registers 2603, 2604 and 2605 provide their 32-bit mask values to the '00', '01' and '10' input terminals, respectively, of multiplexer 2610. Multiplexer 2610 routes one of the 32-bit mask values in response to the received mask_id value. In the described example, the mask_id value initially has a value of '00', such that multiplexer 2610 initially routes the 32-bit mask value M3[31:0] from mask register 2603 (i.e., the mask value associated with mask /3). Note that within the other mask groups, the 32-bit mask values associated with masks /6, /9, /12, /15, /18, /21, /24, /27 and /30 are also routed by similar multiplexers (not shown) at this time.

AND logic block 2613 receives the 32-bit IPv4 search data value SD[31:0] and the 32-bit mask value routed by multiplexer 2610. In response, AND logic block 2613 performs bit-wise logical AND operations, thereby providing a 32-bit masked search data value MSD[31:0]. During the first search phase, this 32-bit mask search data value MSD[31:0] includes the search data bits SD[31:29], followed by 29 logic '0' bits. The mask_id value is concatenated to the end of the masked search data MSD[31:0], thereby creating a search value SV[33:0]. In general, the search value SV[33:0] may be represented as follows: SV[33:0]={{SD[31:(31−M+1)], {32−M{1'b0}}}, mask_id}, wherein M is the mask length.

The search value SV[33:0] is provided to BSE 2601, which implements a corresponding search operation. The results of this search operation (R_3,4,5) are provided to priority encoder 2620. These search results indicate whether or not a 3-bit longest prefix match was detected within BSE 2601, and the identity of any detected match. Note that the results of the search operations associated with masks /6, /9, /12, /15, /18, /21, /24, /27 and /30 are also provided to priority encoder 2620 by the corresponding mask groups {6,7,8}, {9,10,11}, {12,13,14}, {15,16,17}, {18,19,20}, {21,22,23}, {24,25,26}, {27,28,29} and {30,31,32} at this time. Priority encoder 2620 selects and stores the search result corresponding with the longest detected match.

After the first set of search operations has been completed, the mask_id value is incremented to '01', and a second set of search operations is performed within the mask groups (using the same search data value). At this time, multiplexer 2610 routes the 32-bit mask value M4[31:0] from mask register 2604 (i.e., the mask value associated with mask /4). Note that within the other mask groups, the 32-bit mask values associated with masks /7, /10, /13, /16, /19, /22, /25, /28 and /31 are also routed by similar multiplexers (not shown) at this time. Search operations are then performed in the manner described above, thereby providing a second set of search results (associated with masks /4, /7, /10, /13, /16, /19, /22, /25, /28 and /31) to priority encoder 2620. Again, priority encoder 2620 selects and stores the search result corresponding with the longest detected match (which may have occurred during either the first or second set of search operations).

After the second set of search operations has been completed, the mask_id value is incremented to '10', and a third set of search operations is performed (using the same search data value). At this time, multiplexer 2610 routes the 32-bit mask value M5[31:0] from mask register 2605 (i.e., the mask value associated with mask /5). Note that within the other mask groups, the 32-bit mask values associated with masks /8, /11, /14, /17, /20, /23, /26, /29 and /32 are also provided by similar multiplexers (not shown). Search operations are completed in the manner described above, thereby providing a third set of match results (associated with masks /5, /8, /11, /14, /17, /20, /23, /26, /29 and /32) to priority encoder 2620. Again, priority encoder 2620 selects and stores the search result corresponding with the longest detected match (which may have occurred during either the first, second or third set of search operations). At this time, priority encoder 2620 provides the search result having the longest prefix match (which may be an exact match).

Although the mask_id is used as the least significant bits of the data representation in the described examples, it is understood that the mask_id could be used as the most significant bits of the data representation in other embodiments.

BSE structure 2600 provides a search throughput of one search every three clock cycles (assuming the search operations are pipelined in the manner described above in connection with FIG. 23). In an alternate embodiment, the BSE instances of BSE structure 2600 are implemented using dual-port memories, such that two searches can be performed in parallel within each BSE instance. This embodiment provides a search throughput of 2 searches for three clock cycles, which is 1 search per 1.5 clock cycles. Memories having more than two ports can be used to further improve the search throughput.

In one embodiment, BSE structure 2600 is implemented by 2048 BSE-512 structures, wherein each of these BSE-512 structures is assigned to a corresponding mask group, as required. The worst case add/delete latency in this embodiment is about 10K clock cycles.

In an alternate embodiment, BSE structure 2600 is implemented by BSE instances having different capacities (i.e., different numbers of entries/levels). For example, BSE structure 2600 can be implemented by one BSE-64 instance, four BSE-128 instances, seven BSE-512 instances and 255 BSE-4K instances. In a particular embodiment, the smaller BSE instances are used to implement smaller mask groups and the larger BSE instances are used to implement larger mask groups. For example, the BSE-64 instance can be used implement the {3,4,5} mask group, one of the BSE-128 instances can initially be used to implement the {6,7,8} mask group, and one of the BSE-512 instances can initially be used to implement the {9,10,11} mask group. Each of the remaining mask groups {12,13,14} to {30,31,32} may be initially implemented by a corresponding one of the BSE-4K instances. When a BSE instance assigned to a particular mask group becomes full (as determined by a corresponding counter), a BSE instance of the nearest size is added to the mask group. In this manner, the BSE structure 2600 grows dynamically on an as-needed basis.

Depending upon the search throughput requirements, number of mask lengths in each mask group can be varied. For example, four mask lengths could be included in each mask group. However, this would reduce the search throughput to one search every four clock cycles. Note that all mask lengths could be included in a single mask group, thereby allowing each BSE instance to store entries associated with all mask lengths. However, this would reduce the search throughput to one search every 32 clock cycles (and also require a 5-bit mask_id).

In the embodiments described above, a BSE instance is not provided for the mask group {1,2} because there are only 6 possible entries in this mask group. Because the total of possible entries for the mask group {1,2} is so small, this mask group can readily be implemented using a simple structure, such as dedicated registers.

Note that the number of IPv4 entries possible for the various mask groups can be determined as follows.

{1,2} are $2^1+2^2=6$
{3,4,5} are $2^3+2^4+2^5=2^6-2^3=2^3*7=56$
{6,7,8} are $2^6+2^7+2^8=2^9-2^6=2^6*7=448$
{9,10,11} are $2^9+2^{10}+2^{11}=2^{12}-2^9=2^9*7=3584$ In accordance with one variation, the longest prefix match methods described above for IPv4 entry searching can be extended to implement similar longest prefix match methods for IPv6 entry searching. Because IPv6 entries include 128-bits, longest prefix match methods for IPv6 entry searching can be achieved by extending the techniques described above to masks/mask groups that include 128-bits.

LPM BSE Memory Estimation and Latencies for 128K Entries to 1M Entries

Table 6 below sets forth estimated memory requirements, search latencies and worst case add-delete latencies for longest prefix match BSE structures having 128K, 256K, 512K and 1M entries, in accordance with specific implementations of the present invention. These estimates can vary depending on the selected BSE instances.

TABLE 6

| Total Entries | BSE instances | Memory Requirements (per BSE instance) | Search latency | Worst Case Add-Delete latency |
|---|---|---|---|---|
| 128K | 256 * BSE-512 | (63 * 32) flops + 64 * (32 * 7) SRAM | 12 clocks | 5 * 512 clocks |
| 256K | 256 * BSE-1K | (15 * 32) flops + 16 * (32 * 7) + 128 * (32 * 7) SRAM | 12 clocks | 5 * 1024 clocks |
| 512K | 256 * BSE-2K | (31 * 32) flops + 32 * (32 * 7) + 256 * (32 * 7) SRAM | 16 clocks | 5 * 2048 clocks |
| 1M | 256 * BSE-4K | (63 * 32) flops + 64 * (32 * 7) + 512 * (32 * 7) SRAM | 16 clocks | 5 * 4096 clocks |

Note that the worst case add/delete latency for a BSE-2K instance is 10K clocks. For a single binary tree this latency scales as per the equation, (5*num_elements) clocks. However, in accordance with one embodiment of the present invention, the worst case add/delete latency is limited to 20K clocks by implementing multiple BSE-4K instances in parallel. As shown above in Table 6, for example, 256 parallel BSE-4K instances can be used to implement one 1M entry BSE structure having a worst case add/delete latency of 20K clocks.

Network Switch

An example of a network switch that implements the BSE structure of the present invention will now be described.

Figure 27:
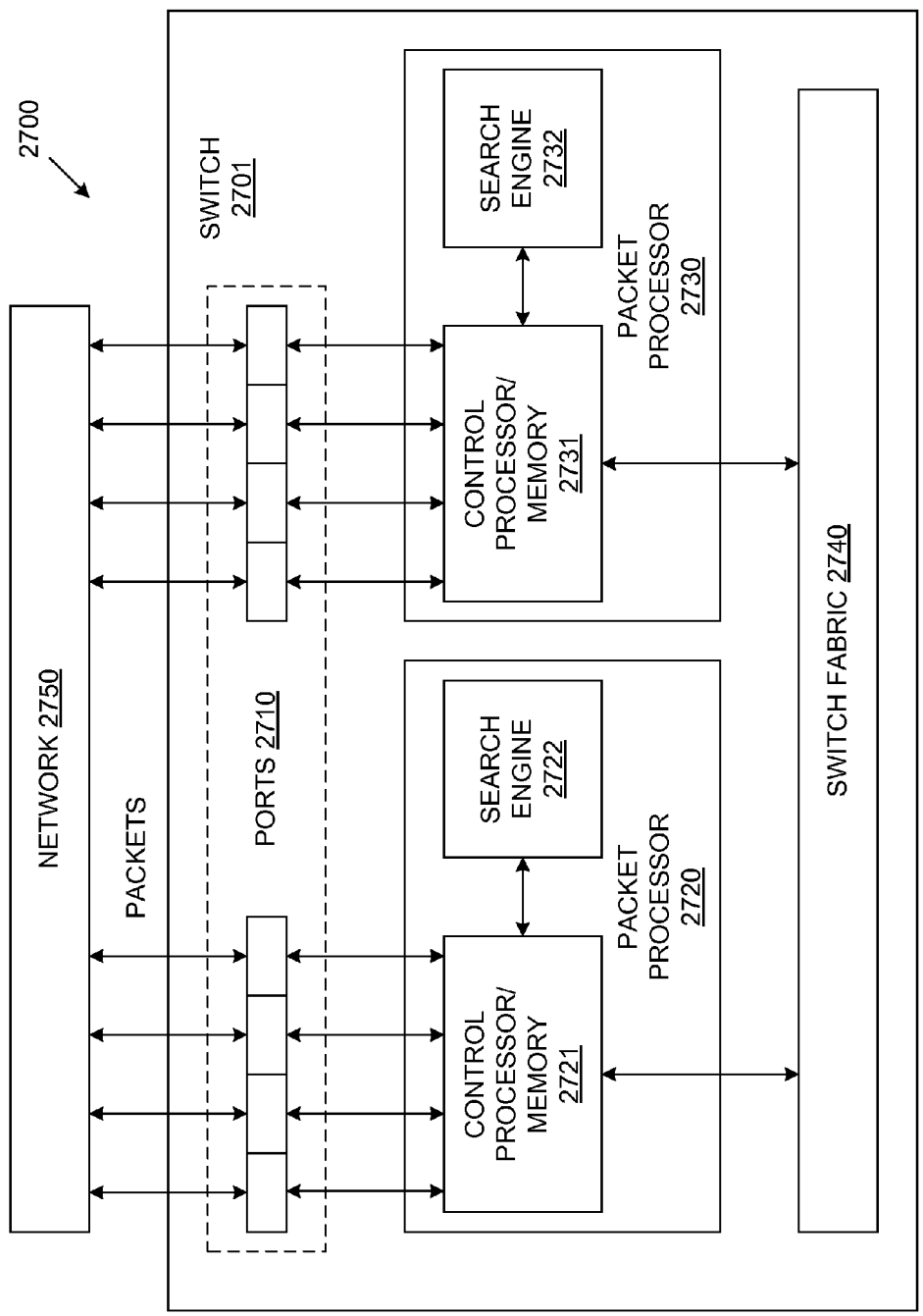
FIG. 27 is a diagram of a system that includes a network switch which includes a BSE structure in accordance with one embodiment of the present invention.

FIG. 27 is a diagram of a system 2700 that includes a network switch 2701, in which the BSE structures described above may be implemented. The term "switch" is used broadly, and may include any packet switching device in any kind of network. For instance, the switch may be part of a LAN or a SAN. The switch may transmit Ethernet, Fibre Channel, or Fibre Channel over Ethernet packets.

In particular, FIG. 27 shows a switch 2701, which includes a plurality of input/output ports 2710 coupled to a network 2750, e.g., Ethernet or Fibre Channel network. Switch 2701 also includes packet processors 2720 and 2730 that receive receives packets from, and output packets to, the ports 2710, directly or indirectly. Packet processors 2720 and 2730 include control processors 2721 and 2731, respectively, and search engines 2722 and 2732, respectively. In the described example, each of the search engines 2722 and 2732 implements a BSE structure in accordance with one or more of the embodiments described above. Search engines 2722 and 2732 are shown integrated within packet processors 2720 and 2730, but may be implemented in separate components in other embodiments. Each packet processor 2720, 2730 may be an ASIC or FPGA. As described above, each of the search engines 2722 and 2732 includes a corresponding memory, which may be, for instance, a RAM memory (e.g., DRAM, SRAM). The memory within search engines 2722 and 2732 consumes less power than a similar sized CAM. The BSE structures to be implemented by search engines 2722 and 2732 are programmed in the corresponding memories, in the manner described above in the various examples. The BSE structures implemented within search engines 2722 and 2732 include add/delete logic (as described above), which operates in response to commands provided by control processors 2721 and 2731, respectively. Each of the control processors 2721 and 2731 includes a corresponding memory that stores the programs run by the control processor.

In operation, as an example, a packet received from network 2750 on one of the ports 2710 is provided to control processor 2721 within packet processor 2720. Control processor 2721 provides the packet to search engine 2722, which processes this packet using information stored in this search engine 2722. In particular, search engine 2722 performs a search operation in accordance with any one of the various embodiments described above. Search engine 2722 provides the search result to control processor 2721. In response, control processor 2721 uses the search result to address the associated packet for forwarding. Control processor 2721 outputs the packet (which may include an internal header) to switching fabric 2740. Switching fabric 2740 routes the packet to one of the packet processors 2720 or 2730 in accordance with destination information and other information in the packet. The output packet processor 2720 or 2730 may further process the packet prior to outputting the packet to one of the ports 2710, and from there out into the network 2750.

Although the embodiments discussed herein describe the L3 (layer 3) lookup of IPv4 and IPv6 addresses (routes), it is understood that other types of lookups are typically performed by a network switch. In an exemplary embodiment, each packet received by a network switch will go through some or all of the three following lookup operations: (1) L2 (layer 2) lookup of MAC (media access controller) addresses and VLAN (virtual local area network) identifiers; (2) L3 lookup of IPv4 and IPv6 routes; and (3) L2/L3/L4 (layer 4) lookup for Access Control Lists (ACLs). In accordance with one embodiment, each of these lookup operations is performed by packet processor 2720 (or packet processor 2730).

The L2 lookups are the easiest to convert from a CAM implementation to the binary search implementation as described herein using, e.g., RAM only and no CAM, because these lookups typically don't include wild card searches. Thus, the L2 lookups can be readily implemented using the binary search engines described above and below.

L3 lookups may be harder to convert to from a CAM implementation to a binary search implementation using RAM only because these lookups include longest prefix match (LPM) operations. However, the binary search engine implementation of the present invention can be used to implement L3 lookups in the manner described above. The BSE structures used to perform the L2 and L3 lookups can readily be fabricated on the same integrated circuit chip in accordance with one embodiment of the present invention. For example, the BSE structures used to perform the L2 and L3 lookups can be fabricated on the same chip as packet processor 2720 (or packet processor 2730).

The ACL lookups don't as easily lend themselves to a BSE based implementation because of the large number of combinations possible. As such, ACL lookups can be implemented using a CAM on the same integrated circuit chip (e.g., ASIC, FPGA) that is used to implement the L2 and L3 lookups using RAM on the same chip, e.g., on the packet processor chip.

Figure 28:
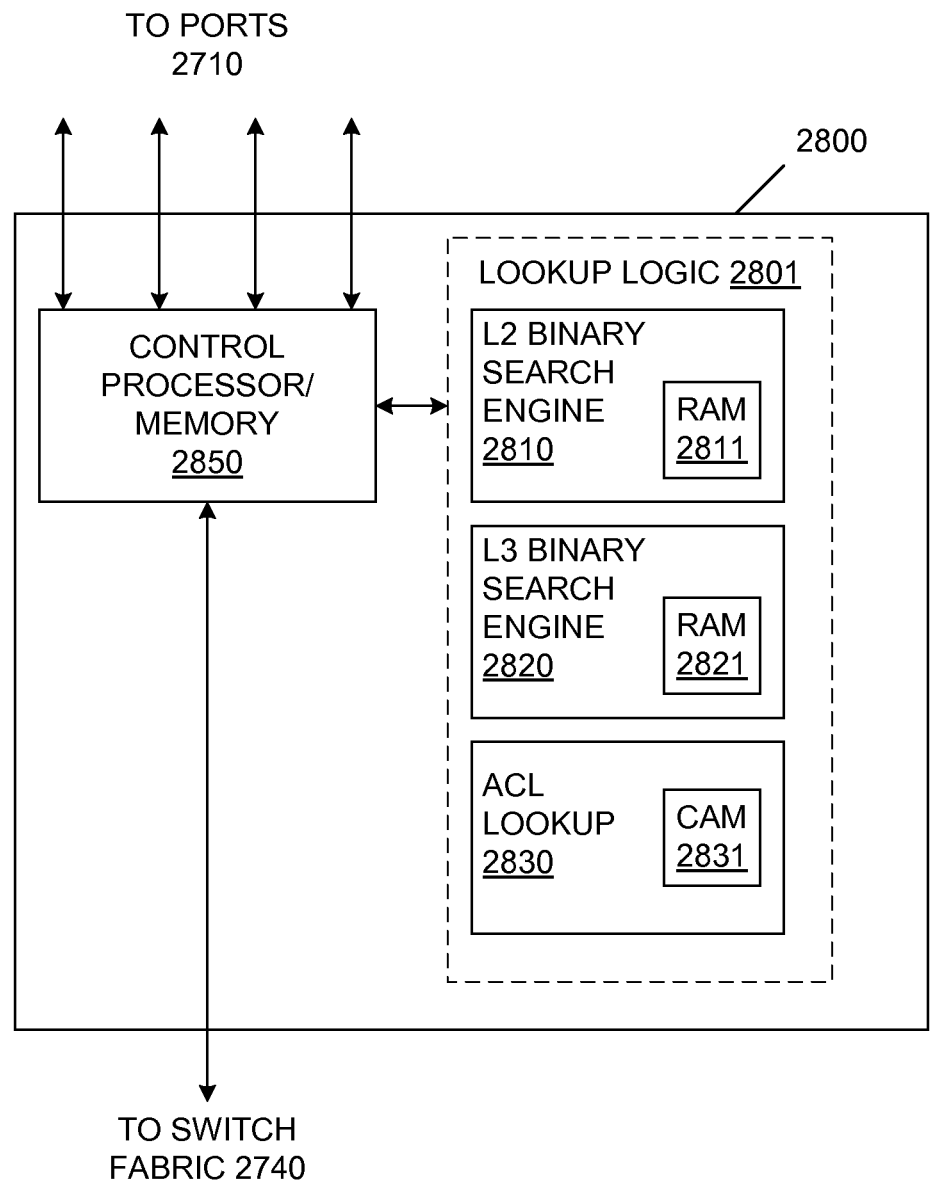
FIG. 28 is a block diagram of a packet processor that can be used in the network switch of FIG. 27 in accordance with another embodiment of the present invention.

FIG. 28 is a block diagram of a packet processor 2800, which can be used in place of packet processor 2720 (or 2730) within network switch 2701 (FIG. 27), in accordance with one embodiment of the present invention. In the described embodiment, packet processor 2800 is implemented by an ASIC or FPGA. That is, all elements of packet processor 2800 are located on a single integrated circuit chip. Control processor 2850 receives packets from ports 2710, and provides these packets to lookup logic 2801, which includes L2 binary search engine 2810, L3 binary search engine 2820 and ACL (L2/L3/L4) lookup logic 2830.

L2 binary search engine 2810 includes a RAM 2811, which stores associated L2 information, such as MAC addresses and VLAN identifiers. L2 binary search engine 2810 implements L2 lookups using the binary search engine implementation of the present invention, which has been described in detail above. The results of the L2 lookups are returned to control processor 2850.

L3 binary search engine 2820 also includes a RAM 2821, which stores associated L3 information, such as IPv4/IPv6 addresses. L3 binary search engine 2820 implements L3 lookups (e.g., with LPM) using the binary search engine implementation of the present invention, which has been described in detail above. The results of the L3 lookups are returned to control processor 2850. Although the L2 and L3 binary search engines 2810 and 2820 have been described as having dedicated RAMs 2811 and 2812, respectively, it is understood that the L2 and L3 binary search engines 2810 and 2820 may share a single RAM in other embodiments of the present invention.

ACL lookup logic 2830 includes a relatively small CAM 2831, which stores associated ACL information. ACL lookup logic 2830 implements access control list lookup operations using the small CAM 2831, and returns the results to control processor 2850. Alternatively, a CAM external to the packet processor 2800 may be used in combination with the on-chip RAMS used for the L2 and/or L3 lookups.

In response to the L2, L3 and ACL lookup results received from lookup logic 2801, control processor 2850 performs further processing on the received packets, including modifying these packets, and providing these packets to switch fabric 2740 for routing.

Although the present invention has been described in connection with various embodiments, it is understood that variations of these embodiments would be obvious to one of ordinary skill in the art. Thus, the present invention is limited only by the following claims.

We claim:

1. A method of performing a longest prefix match operation comprising:
   applying a search value using a processor to a plurality of binary search engines in parallel, wherein each of the binary search engines stores masked entries of a corresponding mask length in a binary tree format;
   masking the search value to create a first plurality of masked search values, each associated with a corresponding one of the binary search engines, and each having a masked length equal to the mask length of the corresponding binary search engine;
   comparing the first plurality of masked search values with the masked entries of the corresponding binary search engines;
   identifying a binary search engine that detects a match and has a longest corresponding mask length; and
   providing a longest prefix match result from the binary search engine that detects a match and has the longest corresponding mask length.

2. The method of claim 1, further comprising pipelining the steps of claim 1, whereby longest prefix match results are provided during consecutive clock cycles.

3. The method of claim 1, wherein the search value includes a plurality of M bits, and there are M different binary search engines.

4. The method of claim 1, further comprising varying a size of a first one of the binary search engines in response to a number of masked entries stored in the first one of the binary search engines.

5. The method of claim 1, further comprising:
   initially implementing a first one of the binary search engines with a single binary search engine instance; and then
   implementing the first one of the binary search engines with two parallel binary search engine instances when the single binary search engine instance becomes full.

6. The method of claim 1, further comprising selecting at least two of the binary search engines to have different capacities.

7. The method of claim 1, wherein each of the binary search engines stores masked entries of a corresponding plurality of mask lengths.

8. The method of claim 7, further comprising
   masking the search value to create a second plurality of masked search values, each associated with a corresponding one of the binary search engines, wherein the first plurality of masked search values and the second plurality of masked search values have different masked lengths for the same associated binary search engines; and
   comparing the second plurality of masked search values with the masked entries of the corresponding binary search engines.

9. The method of claim 1, wherein the step of comparing comprises traversing binary tree structures of the binary search engines in response to the corresponding masked search values.

10. The method of claim 9, wherein within each of the binary search engines, the step of comparing further comprises:
    retrieving a first set of masked entries from a first level of the binary search engine;
    comparing the first set of masked entries with the corresponding masked search value to identify a second set of masked entries in a second level of the binary search engine; then
    retrieving the second set of masked entries from the second level of the binary search engine; and
    comparing the second set of masked entries with the corresponding masked search value.

11. The method of claim 1, further comprising implementing the binary search engines using random access memory (RAM) structures to store the masked entries.

12. The method of claim 1, further comprising storing masked entries of a plurality of consecutive corresponding mask lengths in each of the binary search engines.

13. The method of claim 1, further comprising:
    storing masked entries of a first corresponding mask length in a first binary search engine implemented by a first memory having a first storage capacity;
    storing masked entries of a second corresponding mask length in a second binary search engine implemented by a second memory having a second storage capacity, wherein the first corresponding mask length is shorter than the second corresponding mask length, and the first storage capacity is less than the second storage capacity.

14. The method of claim 1, further comprising:
    storing masked entries of a first corresponding mask length in a first binary search engine implemented by a first memory having a first width;
    storing masked entries of a second corresponding mask length in a second binary search engine implemented by a second memory having a second width, wherein the first corresponding mask length is shorter than the second corresponding mask length, and the first width is less than the second width.

15. The method of claim 1, wherein each of the binary search engines stores masked entries of one and only one corresponding mask length.

16. A method of performing a longest prefix match operation comprising:
    storing masked entries in a plurality of binary search engines, wherein each of the binary search engines stores masked entries of a corresponding group of mask lengths in a binary tree format;
    applying a search value using a processor to each of the binary search engines in parallel;
    masking the search value within each of the binary search engines, thereby creating a plurality of first masked search values, each having a masked length equal to a first mask length of the group of mask lengths of the corresponding binary search engine;
    comparing each of the first masked search values with the masked entries of the corresponding binary search engines, and identifying any of the binary search engines that detect a match; then
    masking the search value within each of the binary search engines, thereby creating a plurality of second masked search values, each having a masked length equal to a second mask length of the group of mask lengths of the corresponding binary search engine;

comparing each of the second masked search values with the masked entries of the corresponding binary search engines, and identifying any of the binary search engines that detect a match;

from the binary search engines that detect a match, selecting a binary search engine having a longest corresponding mask length; and providing a longest prefix match result from the binary search engine that detects a match and has the longest corresponding mask length.

17. The method of claim 16, further comprising providing longest prefix match results during consecutive clock cycles.

18. The method of claim 16, further comprising:
initially implementing each of the binary search engines with a single binary search engine instance; and
assigning a second binary search engine instance to a binary search engine only after the corresponding single binary search engine instance becomes full.

19. The method of claim 16, further comprising selecting at least two of the binary search engines to have different memory capacities.

20. The method of claim 16, wherein the steps of comparing comprise traversing binary tree structures of the binary search engines in response to the corresponding masked search values.

21. The method of claim 20, wherein within each of the binary search engines, the steps of comparing further comprise:
retrieving a first set of masked entries from a first level of the binary search engine;
comparing the first set of masked entries with the corresponding masked search value to identify a second set of masked entries in a second level of the binary search engine; then
retrieving the second set of masked entries from the second level of the binary search engine; and
comparing the second set of masked entries with the corresponding masked search value.

22. The method of claim 16, further comprising implementing the binary search engines using random access memory (RAM) structures.

23. The method of claim 16, wherein each group of mask lengths includes a plurality of consecutive mask lengths.

24. A structure for performing a longest prefix match operation comprising:
a plurality of binary search engines, each storing masked entries of one or more corresponding mask lengths in a binary tree format;
a search interface for receiving a search value;
means for masking the search value to create a first plurality of masked search values, wherein each of the first plurality of masked search values is applied to a corresponding one of the binary search engines;
means for comparing each of the first plurality of masked search values with the masked entries stored by the corresponding one of the binary search engines;
means for identifying one of the binary search engines that detects a match between the applied masked search value and one of the stored masked entries, and has a longest corresponding mask length; and
means for providing a longest prefix match result from the binary search engine that detects a match and has the longest corresponding mask length.

25. The structure of claim 24, wherein the search value includes a plurality of M bits, and there are M different binary search engines.

26. The structure of claim 24, wherein at least one of the binary search engines comprises:
a first binary search engine instance that stores a first set of masked entries in the binary tree format; and
a second binary search engine instance that stores a second set of masked entries in the binary tree format, wherein the first and second binary search engine instances operate in parallel.

27. The structure of claim 24, wherein the plurality of binary search engines comprise a first binary search engine having a first memory capacity and a second binary search engine having a second memory capacity, greater than the first memory capacity.

28. The structure of claim 27, wherein the one or more corresponding mask lengths of the masked entries of the first binary search engine are shorter than the one or more corresponding mask lengths of the masked entries of the second binary search engine.

29. The structure of claim 24, wherein each of the binary search engines comprise an array of random access memory (RAM) cells.

30. The structure of claim 29, wherein the RAM cells are single-port memory cells.

31. The structure of claim 24, wherein each of the binary search engines comprises:
a first memory stage that stores a first set of masked entries from a first level of the binary tree format; and
a second memory stage that stores a second set of masked entries from a second level of the binary tree format.

32. The structure of claim 24, wherein the plurality of binary search engines comprise a first binary search engine having a first memory width and a second binary search engine having a second memory width, greater than the first memory width.

33. The structure of claim 32, wherein the one or more corresponding mask lengths of the masked entries of the first binary search engine are shorter than the one or more corresponding mask lengths of the masked entries of the second binary search engine.

34. The structure of claim 24, further comprising:
means for masking the search value to create a second plurality of masked search values, wherein each of the second plurality of masked search values is applied to a corresponding one of the binary search engines, wherein the first plurality of masked search values and the second plurality of masked search values have different masked lengths for the same binary search engines; and
means for comparing each of the second plurality of masked search values with the masked entries stored by the corresponding one of the binary search engines.

* * * * *